United States Patent [19]

Shizuno et al.

[11] Patent Number: 5,184,277
[45] Date of Patent: Feb. 2, 1993

[54] CERAMIC CAPACITOR AND METHOD FOR FABRICATING THE SAME

[75] Inventors: Hisamitsu Shizuno; Hirosi Kisi; Hirosi Saito; Makoto Fujii, all of Tokyo, Japan

[73] Assignee: Taiyo Yuden Kabusikigaisha, Japan

[21] Appl. No.: 768,242

[22] PCT Filed: Mar. 28, 1991

[86] PCT No.: PCT/JP91/00397

§ 371 Date: Oct. 17, 1991

§ 102(e) Date: Oct. 17, 1991

[87] PCT Pub. No.: WO91/15024

PCT Pub. Date: Oct. 3, 1991

[30] Foreign Application Priority Data

Mar. 28, 1990 [JP] Japan ................................. 2-76775
Mar. 28, 1990 [JP] Japan ................................. 2-76776

[51] Int. Cl.$^5$ ........................ H01G 4/10; H01G 7/00
[52] U.S. Cl. ........................ 361/321; 29/25.42
[58] Field of Search ........................ 29/25.42; 361/321

[56] References Cited

FOREIGN PATENT DOCUMENTS 224105 9/1988 Japan .
176278 7/1989 Japan .

Primary Examiner—Donald A. Griffin
Attorney, Agent, or Firm—Donald E. Townsend; Ronald R. Snider; Teresa J. Banta

[57] ABSTRACT

A ceramic capacitor having excellent electric characteristics includes internal electrodes comprising a base metal such as Ni, and a method for fabricating the capacitor includes the step of firing under a non-oxidation atmosphere. A dielectric layer of the ceramic capacitor comprises a basic and additional components. The basic components comprises a material represented by the following formula:

$$(1-\alpha)\{(Ba_{k-x-z}M_xL_z)O_k(Ti_{1-y}R_y)O_{2-y/2}\} + \alpha BaZrO_3$$

where, M is Mg and/or Zn, L is Ca and/or Sr, R is a rare earth element, and $\alpha$, k, x, z and y are nuermals fulfilling the conditions of $0.005 \leq \alpha \leq 0.04$, $1.00 \leq k \leq 1.05$, $0 < x < 0.10$, $0 < z \leq 0.05$, $0.01 \leq x + z \leq 0.10$, and $0 < y \leq 0.04$. The additional component comprises Li$_2$O (or B$_2$O$_3$), SiO$_2$ and MO (MO is at least one metal oxide selected from the group consisting of BaO, SrO, CaO, MgO and ZnO).

4 Claims, 2 Drawing Sheets

CERAMIC CAPACITOR AND METHOD FOR FABRICATING THE SAME

FIELD OF THE INVENTION

The invention relates to a ceramic capacitor having a one-layer structure or a laminated structure in which one or more than one dielectric ceramic layer is (are) sandwiched between internal electrodes, and a method for fabricating the same.

BACKGROUND OF THE INVENTION

In a conventional method for fabricating a laminated ceramic capacitor, a desired pattern of conductive paste consisting mainly of noble metal such as platinum (Pt) or palladium (Pd) is printed on a non-sintered ceramic sheet (green sheet) consisting of dielectric ceramic material powder. Then, a plural number of the green sheets are laminated and attached each other, and the laminated green sheets are fired at a temperature in the range of 1300° C. to 1600° C. under an oxidation atmosphere.

The non-sintered ceramic sheets consisting of dielectric ceramic sheets consisting of dielectric ceramic material powder become dielectric ceramic layers by firing the sheets, and the conductive paste consisting mainly of noble metal such as platinum or palladium become internal electrodes.

As described above, by adopting the conductive paste consisting mainly of noble metal such as platinum or palladium, a desired internal electrode can be obtained without oxidation thereof even if the material thereof is fired at a high temperature in the range of 1300° C. to 1600° C. under an oxidation atmosphere.

However, noble metals such as platinum or palladium are expensive, so that the laminated ceramic capacitors become essentially costly.

In order to resolve the problem described above, the applicant of the present invention has proposed in Japanese Patent Publication No. 61-14607, in which dielectric ceramic compositions including basic components consisting of $(Ba_{k-x}M_x)O_kTiO_2$ (M is Mg and/or Zn) and additional components consisting of $Li_2O$ and $SiO_2$ are disclosed.

Japanese Patent Publication No. 61-14608 has disclosed dielectric ceramic compositions including additional components consisting of $Li_2O$, $SiO_2$ and MO (MO is one or more than one kind of metal oxides selected from a group consisting of BaO, CaO and SrO) instead of $Li_2O$ and $SiO_2$ in the cited reference No. 61-14607.

Japanese Patent Publication No. 61-14609 has disclosed dielectric ceramic compositions consisting of basic components consisting of $(Ba_{k-x-y}M_xL_y)O_k\cdot TiO_2$ (M is Mg and/or Zn, and L is Sr and/or Ca) and additional components consisting of $Li_2O$ and $SiO_2$.

Japanese Patent Publication No. 61-14610 has disclosed dielectric ceramic compositions including additional components consisting of $Li_2O$, $SiO_2$ and MO (MO is one or more than one kind of metal oxides selected from a group consisting of BaO, CaO and SrO) instead of $Li_2O$ and $SiO_2$ in the cited reference No. 61-14609.

Japanese Patent Publication No. 61-14611 has disclosed dielectric ceramic compositions consisting of basic components consisting of $(Ba_{k-x}M_x)O_kTiO_2$ (M is one or more than one kind of metals selected from a group consisting of Mg, Zn, Sr and Ca) and additional components consisting of $B_2O_3$ and $SiO_2$.

Japanese Patent Publication No. 62-1595 has disclosed dielectric ceramic compositions consisting of basic components consisting of $(Ba_{k-x}M_x)O_kTiO_2$ (M is one or more than one kind of metals selected from a group consisting of Mg, Zn, Sr and Ca) and additional components consisting of $B_2O_3$ and MO (MO is one or more than one kind of metal oxides selected from a group consisting of BaO, MgO, ZnO, SrO and CaO).

Japanese Patent Publication No. 62-1596 has disclosed dielectric ceramic compositions including additional components consisting of $B_2O_3$, $SiO_2$ and MO (MO is one or more than one kind of metal oxides selected from a group consisting of BaO, MgO, ZnO, SrO and CaO) instead of $B_2O_3$ and MO in the cited reference No. 62-1595.

By using one of the dielectric ceramic compositions disclosed in the cited references as a dielectric layer, a dielectric ceramic capacitor can be obtained by firing at a temperature up to 1200° C. under a reducible atmosphere, in which a dielectric constant is at least 2000 and a dielectric constant change rate by temperature changes is in the range of $-10\%$ to $+10\%$ at a temperature in the range of $-25°$ C. to $+85°$ C.

Recently, electric circuits become high densed, which requires intensely miniaturization of ceramic capacitors, so that it has been expected to develop a ceramic capacitor including a dielectric ceramic composition which has a dielectric constant still larger than that of the dielectric ceramic compositions disclosed in the cited references shown above.

It has been also expected to develop a ceramic capacitor including a dielectric ceramic composition which has a relatively small capacitance change rate by temperature changes at a temperature in the range wider than that in the dielectric ceramic compositions disclosed in the cited references shown above.

Accordingly, it is an object of the invention to provide a ceramic capacitor including a dielectric ceramic composition which has a dielectric constant at least 3000, a dielectric loss tan ($\delta$) up to 2.5%, a resistivity $\rho$ at least $1 \times 10^6 M\,\Omega\cdot cm$, and a dielectric constant change rate by temperature changes in the range of $-15\%$ to $+15\%$ at a temperature in the range of $-55°$ C. to 125° C. (the standard is set at 25° C.) and in the range of $-10\%$ to $+10\%$ at a temperature in the range of $-25°$ C. to 85° C. (the standard is set at 20° C.) by firing the composition even at a temperature up to 1200° C. in a non-oxidation atmosphere, and a method for fabricating the same.

DISCLOSURE OF THE INVENTION

The first invention of the application will be described.

According to the first invention, a ceramic capacitor includes at least one dielectric ceramic layer consisting of a dielectric ceramic composition and internal electrodes sandwiching the dielectric ceramic composition.

The dielectric ceramic composition consists of a fired mixture of a basic component of 100 weight portions and an additional component of 0.2 to 5 weight portions.

The basic component consists of a material represented by the following formula:

$(1-\alpha)\{(Ba_{k-x-z}M_xL_z)O_k(Ti_{1-y}R_y)O_{2-y/2}\} + \alpha BaZrO_3$ where, M is Mg and/or Zn, L is Ca and/or Sr, R is one or more metal elements selected from a group consisting of Sc, Y, Gd, Dy, Ho, Er, Yb, Tb, Tm and Lu. And, $\alpha$, k, x, z and y are numerals fulfilling the following conditions:

$$0.005 \leq \alpha \leq 0.04$$

$$1.00 \leq k \leq 1.05$$

$$0 < x < 0.10$$

$$0 < z \leq 0.05$$

$$0.01 \leq x + z \leq 0.10$$

$$0 < y \leq 0.04$$

A dielectric ceramic composition having desired electric characteristics can be obtained on the condition of $0.005 \leq \alpha \leq 0.04$, however, the capacitance change $\Delta C_{-25}$ by temperature changes becomes out of the range of $-10\%$ to $+10\%$ and $\Delta C_{-55}$ becomes out of the range of $-15\%$ to $+15\%$ if $\alpha$ is smaller than 0.005, on the other hand, the capacitance change rate $\Delta C_{85}$ by temperature changes becomes out of the range of $-10\%$ to $+10\%$ if $\alpha$ is larger than 0.04.

A dielectric ceramic composition having desired electric characteristics can be obtained on the condition of $1.00 \leq k \leq 1.05$, however, the resistivity $\rho$ becomes considerably small, that is smaller than $1 \times 10^6 M\Omega \cdot cm$, if k is smaller than 1.00, on the other hand, a dense sintered material can not be obtained if k is larger than 1.05.

A dielectric ceramic composition having desired electric characteristics can be obtained on the condition of $0.01 \leq x + z \leq 0.10$, however, the capacitance change rate $\Delta C_{-25}$ by temperature changes becomes out of the range of $-10\%$ to $+10\%$ and $\Delta C_{-55}$ becomes out of the range of $-15\%$ to $+15\%$ if $x+z$ is smaller than 0.01, on the other hand, the capacitance change rate $\Delta C_{85}$ becomes out of the range of $-10\%$ to $+10\%$ if $x+z$ is larger than 0.10.

However, a dielectric ceramic composition having desired electric characteristics can not be obtained if z is larger than 0.05 even if $0.01 \leq x+z \leq 0.10$. Therefore, the upper limit of $x+z$ is 0.10 and the upper limit of z should be 0.05, simultaneously.

Mg and Zn of the M component and Ca and Sr of the L component work for almost the same function, so that either of Mg and Zn or both thereof can be used on the condition of $0 < x < 0.10$, and either of Ca and Sr or both thereof can be used on the condition of $0 < z \leq 0.05$.

It is desirable that a value of $x+z$ is in the range of 0.01 to 0.10.

A dielectric ceramic composition having desired electric characteristics can be obtained on the condition of $0 < y \leq 0.04$, however, a dense sintered material can not be obtained if y is larger than 0.04.

Sc, Y, Dy, Ho, Er and Yb of the R component work for almost the same function, so that any one or more than one of them can be used. However, it is desirable that a value of y is up to 0.04 in any case. There is observed a significant effect even if y is a small value in the vicinity of 0.

The R component contributes an improvement of temperature characteristic of the capacitance of the dielectric ceramic composition. By adding the R component into the dielectric ceramic composition, the capacitance change rates $\Delta C_{-55}$ to $\Delta C_{125}$ by temperature changes at a temperature in the range of $-55°$ C. to $125°$ C. become within the range of $-15\%$ to $+15\%$, the capacitance change rates $\Delta C_{-25}$ to $\Delta C_{85}$ by temperature changes at a temperature in the range of $-25°$ C. to $85°$ C. become within a range of $-10\%$ to $+10\%$, and each capacitance change rate at each temperature range becomes small. Additionally, the R component has functions of increasing the resistivity $\rho$ and improving the sintering characteristic of the dielectric ceramic composition.

In the composition formula representing the basic component, x, y, z and k represent numerals of atoms of the elements, respectively, and $1-\alpha$ and $\alpha$ together represent a ratio of the first term $(Ba_{k-x-z}M_xL_z)O_k(Ti_{1-y}R_y)O_{2-y/2}$ and the second term $BaZrO_3$ in the composition formula of the basic component by mol fraction.

A small amount (desirably in the range of 0.05 to 0.1 weight %) of mineralizers such as $MnO_2$ may be added to the basic component to improve the sintering characteristic thereof so long as the addition does not obstruct objects of the invention. Other materials may be also added if necessary.

The starting material for obtaining the basic component may be oxides such as BaO, SrO or CaO, hydroxides or other compounds, in addition to the compounds shown in the embodiments.

Next, an additional component consists of of $Li_2O$, $SiO_2$ and MO (MO is at least one metal oxide selected from a group consisting of BaO, SrO, CaO, MgO and ZnO).

A dielectric ceramic composition having desired electric characteristics can be obtained if the amount of the additional component added is in the range of 0.2 to 5 weight portions in 100 weight portions of the basic component, however, a dense sintered material can not be obtained if the amount of the additional component is smaller than 0.2 weight portions, on the other hand, the dielectric constant $\epsilon_s$ becomes smaller than 3000 and the capacitance change rate $\Delta C_{85}$ by temperature changes becomes out of the range of $-10\%$ to $+10\%$ if the amount of the additional component is larger than 5 weight portions.

The range of a ratio among the amounts of $Li_2O$, $SiO_2$ and MO in the additional component is represented by an area having five vertexes in the ternary system diagram of mol %, as follows:

the first vertex A where the amounts of $Li_2O$ is 1 mol %, $SiO_2$ is 80 mol % and MO is 19 mol %;

the second vertex B where the amounts of $Li_2O$ is 1 mol %, $SiO_2$ is 39 mol % and MO is 60 mol %;

the third vertex C where the amounts of $Li_2O$ is 30 mol %, $SiO_2$ is 30 mol % and MO is 40 mol %;

the fourth vertex D where the amounts of $Li_2O$ is 50 mol %, $SiO_2$ is 50 mol % and MO is 0 mol %; and the fifth vertex E where the amounts of $Li_2O$ is 20 mol %, $SiO_2$ is 80 mol % and MO is 0 mol %.

A dielectric ceramic composition having desired electric characteristics can be obtained if the ratio among the amounts of $Li_2O$, $SiO_2$ and MO in the additional component is within the area in the ternary system diagram of mol % described above, however, a dense sintered material can not be obtained if the ratio is out of the area.

MO component may be one of metal oxides selected from a group consisting of BaO, MgO, ZnO, SrO and CaO, or more than one of them in adequate ratio. The starting material of the additional component may be oxides or hydroxides or other compounds, in addition to ones shown in the embodiments.

The second invention of the application will be described. The second invention is the same as the first invention except of the additional component.

The additional component in the second invention consists of $B_2O_3$, $SiO_2$ and MO (MO is at least one metal oxide selected from a group consisting of BaO, SrO, CaO, MgO and ZnO).

A dielectric ceramic composition having desired electric characteristics can be obtained if the amount of the additional component added is in the range of 0.2 to 5 weight portions in 100 weight portions of the basic component, however, a dense sintered material can not be obtained if the amount of the additional component is smaller than 0.2 weight portions even if the temperature is at 1250° C., on the other hand, the dielectric constant $\epsilon_s$ becomes smaller than 3000 and the capacitance change rate $\Delta C_{85}$ by temperature changes becomes out of the range of $-10\%$ to $+10\%$ if the additional component is larger than 5 weight portions.

The range of the ratio among the amounts of $B_2O_3$, $SiO_2$ and MO in the additional component is represented by an area having six vertexes in the ternary system diagram of mol %, as follows:

the first vertex A where the amounts of $B_2O_3$ is 1 mol %, $SiO_2$ is 80 mol % and MO is 19 mol %;

the second vertex B where the amounts of $B_2O_3$ is 1 mol %, $SiO_2$ is 39 mol % and MO is 60 mol %;

the third vertex C where the amounts of $B_2O_3$ is 30 mol %, $SiO_2$ is 0 mol % and MO is 70 mol %;

the fourth vertex D where the amounts of $B_2O_3$ is 90 mol %, $SiO_2$ is 0 mol % and MO is 10 mol %;

the fifth vertex E where the amounts of $B_2O_3$ is 90 mol %, $SiO_2$ is 10 mol % and MO is 0 mol %; and the sixth vertex F where the amounts of $B_2O_3$ is 20 mol %, $SiO_2$ is 80 mol % and MO is 0 mol %.

A dielectric ceramic composition having desired electric characteristics can be obtained if the ratio among the amounts of $Li_2O$, $SiO_2$ and MO in the additional component is within the area in the ternary system diagram of mol % described above, however, a dense sintered material can not be obtained if the ratio is out of the area.

The starting material for obtaining the additional component may be hydroxides or other compounds in addition to oxides.

The structure of the ceramic capacitor, the range of the ratio in the basic component of the dielectric ceramic composition, and the reasons of the limitations of the range in the second invention are the same as those in the first invention.

Next, the third invention of the application will be described.

According to the third invention, a method for fabricating a ceramic capacitor includes the steps of providing a mixture of non-sintered ceramic powder consisting essentially of basic and additional components, forming a non-sintered ceramic sheet consisting of the mixture, fabricating a laminated structure in which the non-sintered ceramic sheet is sandwiched between at least two conductive paste layers, firing the laminated structure under a non-oxidation atmosphere, and heating the fired laminated structure under an oxidation atmosphere.

The basic component composing the mixture of the non-sintered ceramic powder has the same features of the range of the composition ratio and the reasons of the limitation thereof as those in the first invention.

The additional component composing the mixture of the non-sintered ceramic powder has the same features of the range of the composition ratio, and the reasons of the limitations thereof as those in the first invention.

The weight ratio between the basic component and the additional component is of 0.2 to 5 weight portions of the additional component in 100 weight portions of the basic component. The reason of the limitation is the same as that in the first invention.

The temperature in the firing of a laminated structure under a non-oxidation atmosphere may be changed in accordance with materials composing the inner electrodes. If Ni is adopted as the material of the inner electrode, cohesion of Ni particles may scarcely occur at a temperature in the range of 1050° C. to 1200° C.

The non-oxidation atmosphere may be a neutral atmosphere such as in $N_2$ or Ar, in addition to a reducible atmosphere such as in $H_2$ or CO.

The temperature of heating the fired laminated structure under an oxidation atmosphere may be changed in consideration of oxidation of the electrode materials such as Ni and the ceramic materials.

The temperature of heating the fired laminated structure is set at 600° C. in the embodiments as described after, however, the temperature is not limited to be such a temperature, and the temperature may be any so long as it is below the sintering temperature, and it is more preferred to be in the range of 500° C. to 1000° C.

Next, the fourth invention of the application will be described.

A method for fabricating a ceramic capacitor in the fourth invention is the same as that in the third invention except of the additional component.

The additional component in the fourth invention is the same as the additional component ($B_2O_3$-$SiO_2$-MO) in the second invention, and the range of the composition ratio and the reasons of the limitation are the same as those in the second invention.

In the embodiments described after, ceramic capacitors having laminated structures are described, however, the present inventions may be applied to general ceramic capacitors having one-layer structure.

According to the inventions, as the composition ratio of the dielectric ceramic composition is such that described above, it is enable to provide a ceramic capacitor including a dielectric ceramic composition which has features in which the specific inductive capacity is at least 3000, the dielectric loss tan $\delta$ is up to 2.5%, the resistivity $\rho$ is at least $1\times10^6$ M$\Omega$·cm, and the specific inductive capacity change rates by temperature change is in the range of $-15\%$ to $+15\%$ at a temperature in the range of $-55°$ C. to 125° C. (the standard is set at 25° C.) and $-10\%$ to $+10\%$ at a temperature in the range of $-25°$ C. to 85° C. (the standard is set at 20° C.).

According to the invention, it is enable to fabricate a ceramic capacitor by firing the conductive paste, consisting mainly of base metal such as Ni and the green sheet, simultaneously, at a temperature under 1200° C. under a non-oxidation atmosphere, so that the fabrication cost thereof may be reduced.

DESCRIPTION OF PREFERRED EMBODIMENTS

First, a method for making Sample No. 1 in Table 1 and electric characteristics thereof will be described.

MAKING THE BASIC COMPONENT

Compounds in the combination 1 are weighed, poured into a pot mill with alumina ball and 2.5 l of water, and stirred and mixed for 15 hours to obtain a material mixture.

| compounds | The combination 1 weight (g) | mol portion |
| --- | --- | --- |
| $BaCO_3$ | 1044.06 | 0.96 |
| MgO | 11.11 | 0.05 |
| SrO | 5.71 | 0.01 |
| $TiO_2$ | 435.94 | 0.99 |
| $Yb_2O_3$ | 10.84 | 0.005 |

Here, values of the weight (g) and the mol portion of the compounds in the combination 1 are calculated so as that the first term:

$$(Ba_{k-x-z}M_xL_z)O_k(Ti_{1-y}R_y)O_{2-y/2}$$

(defined as the first basic component hereinafter) in the composition formula of the basic component:

$$(1-\alpha)\{(Ba_{k-x-z}M_xL_z)O_k(Ti_{1-y}R_y)O_{2-y/2}\} + \alpha BaZrO_3 \quad (1)$$

becomes:

$$(Ba_{0.96}Mg_{0.05}Sr_{0.01})O_{1.02}(Ti_{0.99}Y_{0.01})O_{1.995}$$

Next, the material mixture is poured into a stainless pot and dried for 4 hours at 150° C. with using a hot blast drier. The dried material mixture is grinded roughly. The grinded material mixture is baked for 2 hours at 1200° C. in the air with using a tunnel furnace, and the powder of the first basic component in the composition formula (1) of the basic component can be obtained.

In order to obtain the second term $BaZrO_3$ (defined as the second basic component hereinafter) in the composition formula (1) of the basic component, $BaCO_3$ and $ZrO_2$ are weighed to be 615.61 g and 384.39 g, respectively, so that they have the equal amount of mol. The weighted compounds are mixed, dried and grinded. The grinded mixture is baked for 2 hours at 1250° C.

Then, as shown in Sample No. 1 of Table 1, 98 mol portions (976.15 g) of the first basic component powder and 2 mol portions (23.85 g) of the second basic component powder are mixed so that $(1-\alpha)$ is 0.98 mol and $\alpha$ is 0.02 mol, and 1000 g of the basic component is obtained.

MAKING THE ADDITIONAL COMPONENT

Compounds in the combination 2 are weighed, added with 300 cc of alcohol, and stirred for 10 hours in a polyethylene pot with using aluminum balls. Then, the mixture is baked for 2 hours at 1000° C. in the air.

| compounds | The combination 2 weight (g) | mol portion |
| --- | --- | --- |
| $Li_2O$ | 0.44 | 1 |
| $SiO_2$ | 70.99 | 80 |
| $BaCO_3$ | 11.10 | 3.8 |
| $CaCO_3$ | 14.70 | 9.5 |
| MgO | 3.40 | 5.7 |

Here, values of the weight (g) of the compounds in the combination 2 are calculated so as that the $Li_2O$ is 1 mol %, $SiO_2$ is 80 mol %, and MO is 19 mol % {BaO (3.8 mol %) + CaO (9.5 mol %) + MgO (5.7 mol %)}.

Next, the baked mixture is poured into an alumina pot with 300 cc of water and grinded for 15 hours with using alumina balls. Then, the grinded mixture is dried for 4 hours at 150° C., and the powder of the additional component is obtained.

The ratio among BaO, CaO and MgO is that of 20 mol %, 50 mol % and 30 mol %, respectively, as shown in Table 1.

MAKING SLURRY 2 weight portions (20 g) of the additional component is added to 100 weight portions (1000 g) of the basic component. Then, the mixture of the basic and additional components are added with 15 weight % of organic binder consisting of an aqueous solution of acrylic acid ester polymer, glycerin and condensed phosphate and 50 weight % of water. Thus obtained mixture is pured into a ball mill, grinded and mixed to obtain slurry as ceramic material.

MAKING NON-SINTERED CERAMIC SHEET

The slurry is poured into a vacuum foam remover to remove foam thereof, and then is poured into a reverse roll coater to form a molded thin sheet which is continuously laid on a long polyester film. The molded thin sheet is heated to 100° C. on the polyester film to dry, and a non-sintered ceramic sheet having a thickness of approximately 25 μm is obtained. The non-sintered ceramic sheet having a large length is cut to be a 10 cm square each to be used.

MAKING AND PRINTING CONDUCTIVE PASTE

A mixture of 10 g of Ni powder having an average particle diameter of 1.5 μm and 0.9 g of ethylcellulose dissolved in 9.1 g of butylcarbitol is put in a stirrer and stirred for 10 hours, and the conductive paste for internal electrodes is obtained. Then, the conductive paste is printed on one surface of the non-sintered ceramic sheet through a screen having 50 patterns each of which is 14 mm in length and 7 mm in width, and is dried.

LAMINATING THE NON-SINTERED CERAMIC SHEET

Two of the non-sintered ceramic sheets are laminated with facing the printed surfaces thereof upward so that the printed patterns of the upper sheet and those of the lower sheet are shifted each other by a half length of the longer side of one pattern. Then, four of the non-sintered sheets having a total thickness of 60 μm is laminated on each surface of the laminated sheets thus obtained by laminating the two single sheets.

PRESSURE WELDING AND CUTTING THE LAMINATED SHEETS

The laminated sheets are pressure welded by applying a pressure of approximately 40 tons in the direction of the thickness at approximately 50° C. Then, the laminated sheets are cut to be lattices to obtain fifty laminated chips.

FIRING THE LAMINATED CHIP

The laminated chip is put into a furnace in which an atmosphere firing can be carried out, and the temperature is increased by 100° C./h to 600° C. in the atmosphere of the air to burn the organic binder of the laminated chip.

Then, the atmosphere of the furnace is changed from the atmosphere of the air to the reducible atmosphere of $H_2$ (2 volume %) + $N_2$ (98 volume %). The temperature is increased by 100° C./h from 600° C. to 1150° C. with keeping the reducible atmosphere, and the highest temperature of 1150° C. is kept for 3 hours. After that, the temperature is decreased by 100° C./h to 600° C., and the reducible atmosphere is changed to the atmosphere of the air (the acidic atmosphere), and the temperature of 600° C. is kept for 30 minutes to oxidate the laminated chip. Finally, the temperature is decreased to the room temperature, and a laminated fired chip is obtained.

FABRICATING EXTERNAL ELECTRODES

The conductive paste consisting of zinc, glass frit and vehicle is coated on the side surfaces of the laminated fired chip in which the internal electrodes are exposed to the outside, and is dried. Then, the chip is burned for 15 minutes at 550° C. in the air to form a zinc electrode. Copper layer is formed on the zinc electrode by non-electrolytic plating, and Pb-Sn solder layer is formed on the copper layer by electric plating. Thus, a pair of external electrodes are fabricated.

Figure 1:
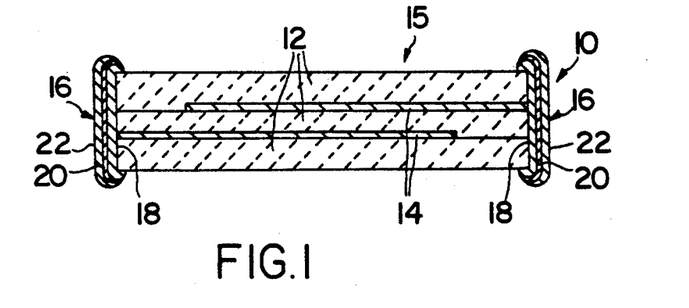
FIG. 1 is a cross sectional view illustrating a laminated ceramic capacitor in a preferred embodiment according to the invention.

Thus, as shown in FIG. 1, the laminated ceramic capacitor 10 consists of a laminated fired chip 15 consisting of a 3-layer dielectric ceramic layer 12 and a 2-layer internal electrode 14 on which a pair of external electrodes 16 are formed.

The external electrode 16 consists of the zinc electrode layer 18, the copper layer 20 formed on the zinc electrode layer 18, and the Pb-Sn solder layer 22 formed on the copper layer 20.

A thickness of the dielectric ceramic layer 12 in the laminated ceramic capacitor 10 is 0.02 mm, and a facing area of a pair of the internal electrodes 14 is 5 mm×5 mm=25 mm². And, the composition of the dielectric ceramic layer 12 after being sintered is substantially the same as the mixed composition of the basic and additional component before experiencing a sintering.

MEASUREMENTS OF ELECTRIC CHARACTERISTICS

The measurements of electric characteristics of the laminated ceramic capacitor 10 were carried out. The results of the measurement are that a dielectric constant $\epsilon_s$ is 3800, tan δ is 1.0%, a resistivity $\rho$ is $6.2 \times 10^6$ MΩ·cm, and an capacitance change rate by temperature changes is $-9.5\%$ ($\Delta C_{-55}$) at $-55°$ C. and $+4.0\%$ ($\Delta C_{125}$) at 125° C. (the standard is set at 25° C.), and $-5.0\%$ ($\Delta C_{-25}$) at $-25°$ C. and $-5.6\%$ ($\Delta C_{85}$) at $+85°$ C. (the standard is set at 20° C.).

The measurements of the electric characteristics are carried out in accordance with the process as shown below.

(A) The dielectric constant $\epsilon_s$ is calculated by values of the capacitance measured on conditions of a temperature at 20° C., a frequency 1 kHz, a voltage (effective value) 1.0 v, a facing area 25 mm² of the pair of the internal electrodes 14, and a thickness 0.02 mm of the dielectric ceramic layer 12 between the pair of the internal electrodes 14.

(B) The dielectric loss tan δ (%) is measured on the same conditions as in the measurement of the dielectric constant as shown above.

(C) The resistivity $\rho$ (M Ω·cm) is calculated by values of resistance between the pair of the external electrodes 11 measured after applying DC 100 V at 20° C. for 1 minute, and the size thereof.

(D) The temperature characteristics of the capacitance is obtained by measuring the capacitance of the sample which is put in a constant temperature bath on conditions of a frequency 1 kHz and a voltage (effective value) 1.0 v at various temperatures of $-55°$ C., $-25°$ C., 0° C., $+25°$ C., $+40°$ C., $+60°$ C., $+85°$ C., $+105°$ C. and $+125°$ C. and calculating the change rates of the capacitances at each temperature from the temperatures 20° C. and 25° C.

The method for making Sample No. 1 and the characteristics thereof have been described as shown above. As for Samples No. 2 to No. 170, laminated ceramic capacitors are fabricated by the same method as that of Sample No. 1, except that the compositions of the basic component are varied as shown in (1) to (9) of Table 1, the compositions of the additional component are varied as shown in (1) to (9) of Table 2, and the temperatures of firing in the reducible atmosphere are varied as shown in (1) to (9) of Table 3. Then, the electric characteristics are measured on the same conditions as those in the measurement of Sample No. 1. The results are shown in (1) to (9) of Table 3.

$(1-\alpha)$ and $\alpha$ of the basic component in (1) to (9) of Table 1 show the ratio between the first and second basic components by mol. On the other hand, (k−x−z), x, z and k show the ratio of numerals of atoms of the elements in the composition formula (1) of the basic component as shown before.

Mg and Zn of the column x in (1) to (9) of Table 1 are the contents of M in the composition formula (1) of the basic component. The values in the column x represent the numeral of atoms thereof, and the values in the column of the total represent the total numeral of the atoms (value x).

Ca and Sr of the column z in (1) to (9) of Table 1 are the contents of L in the composition formula (1) of the basic component. The values in the column z represent the numeral of atoms thereof, and the values in the column of the total represent the total numeral of the atoms (value z).

The added amount of the additional component is represented by weight portions in the 100 weight portions of the basic component. The contents of the column MO of the additional component represent the ratio among BaO, MgO, ZnO, SrO and CaO by mol %.

The temperature characteristics of the capacitance are described as $\Delta C_{-55}$ (%) and $\Delta C_{125}$ (%) which are the change rates of the capacitance at $-55°$ C. and 125° C., respectively (the standard is set at 25° C.), and $\Delta C_{-25}(\%)$ and $\Delta C_{85}(\%)$ which are the change rates of the capacitance at $-25°$ C. and at $+85°$ C., respectively (the standard is set at $20°$ C.).

TABLE 1

| | | | | | | | | | | | | | | | | | |
|---|---|---|---|---|---|---|---|---|---|---|---|---|---|---|---|---|---|
| | | | | Basic Component (100 weight portions) | | | | | | | | | | | | | |
| | | | | | | | | | | | | y | | | | | |
| Sample No | 1-α | α | k-x-z | x Mg | x Zn | x Total | z Ca | z Sr | z Total | x,z Total | Sc | Y | Gd | Dy | Ho | Er | Yb | Total | k |
| (1) | | | | | | | | | | | | | | | | | | | |
| 1 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 2 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 3 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 4 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 5 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 6 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 7 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 8 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 9 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 10 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| *11 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| *12 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| *13 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| *14 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| *15 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| *16 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 17 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 18 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 19 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| 20 | 0.98 | 0.02 | 0.96 | 0.05 | 0 | 0.05 | 0 | 0.01 | 0.01 | 0.06 | 0 | 0 | 0 | 0 | 0 | 0 | 0.01 | 0.01 | 1.02 |
| (2) | | | | | | | | | | | | | | | | | | | |
| 21 | 0.98 | 0.02 | 0.96 | 0.05 | | 0 | 0.05 | 0 | 0.01 | 0.01 | 0.06 | 0 | 0 | 0 | 0 | 0 | 0.01 | 0.01 | 1.02 |
| 22 | 0.98 | 0.02 | 0.96 | 0.05 | | 0 | 0.05 | 0 | 0.01 | 0.01 | 0.06 | 0 | 0 | 0 | 0 | 0 | 0.01 | 0.01 | 1.02 |
| 23 | 0.98 | 0.02 | 0.96 | 0.05 | | 0 | 0.05 | 0 | 0.01 | 0.01 | 0.06 | 0 | 0 | 0 | 0 | 0 | 0.01 | 0.01 | 1.02 |
| 24 | 0.98 | 0.02 | 0.96 | 0.05 | | 0 | 0.05 | 0 | 0.01 | 0.01 | 0.06 | 0.01 | 0 | 0 | 0 | 0 | 0 | 0.01 | 1.02 |
| 25 | 0.98 | 0.02 | 0.96 | 0.05 | | 0 | 0.05 | 0 | 0.01 | 0.01 | 0.06 | 0.01 | 0 | 0 | 0 | 0 | 0 | 0.01 | 1.02 |
| 26 | 0.98 | 0.02 | 0.96 | 0.05 | | 0 | 0.05 | 0 | 0.01 | 0.01 | 0.06 | 0.01 | 0 | 0 | 0 | 0 | 0 | 0.01 | 1.02 |
| 27 | 0.98 | 0.02 | 0.96 | 0.05 | | 0 | 0.05 | 0 | 0.01 | 0.01 | 0.06 | 0 | 0.01 | 0 | 0 | 0 | 0 | 0.01 | 1.02 |
| 28 | 0.98 | 0.02 | 0.96 | 0.05 | | 0 | 0.05 | 0 | 0.01 | 0.01 | 0.06 | 0 | 0.01 | 0 | 0 | 0 | 0 | 0.01 | 1.02 |
| 29 | 0.98 | 0.02 | 0.96 | 0.05 | | 0 | 0.05 | 0 | 0.01 | 0.01 | 0.06 | 0 | 0.01 | 0 | 0 | 0 | 0 | 0.01 | 1.02 |
| 30 | 0.98 | 0.02 | 0.96 | 0.05 | | 0 | 0.05 | 0 | 0.01 | 0.01 | 0.06 | 0 | 0 | 0 | 0 | 0 | 0 | 0.01 | 1.02 |
| 31 | 0.98 | 0.02 | 0.96 | 0.05 | | 0 | 0.05 | 0 | 0.01 | 0.01 | 0.06 | 0 | 0 | 0 | 0 | 0 | 0 | 0.01 | 1.02 |
| 32 | 0.98 | 0.02 | 0.96 | 0.05 | | 0 | 0.05 | 0 | 0.01 | 0.01 | 0.06 | 0 | 0 | 0 | 0 | 0 | 0 | 0.01 | 1.02 |
| 33 | 0.98 | 0.02 | 0.96 | 0.05 | | 0 | 0.05 | 0 | 0.01 | 0.01 | 0.06 | 0 | 0 | 0.01 | 0 | 0 | 0 | 0.01 | 1.02 |
| 34 | 0.98 | 0.02 | 0.96 | 0.05 | | 0 | 0.05 | 0 | 0.01 | 0.01 | 0.06 | 0 | 0 | 0.01 | 0 | 0 | 0 | 0.01 | 1.02 |
| 35 | 0.98 | 0.02 | 0.96 | 0.05 | | 0 | 0.05 | 0 | 0.01 | 0.01 | 0.06 | 0 | 0 | 0.01 | 0 | 0 | 0 | 0.01 | 1.02 |
| 36 | 0.98 | 0.02 | 0.96 | 0.05 | | 0 | 0.05 | 0 | 0.01 | 0.01 | 0.06 | 0 | 0 | 0 | 0.01 | 0 | 0 | 0.01 | 1.02 |
| 37 | 0.98 | 0.02 | 0.96 | 0.05 | | 0 | 0.05 | 0 | 0.01 | 0.01 | 0.06 | 0 | 0 | 0 | 0.01 | 0 | 0 | 0.01 | 1.02 |
| 38 | 0.98 | 0.02 | 0.96 | 0.05 | | 0 | 0.05 | 0 | 0.01 | 0.01 | 0.06 | 0 | 0 | 0 | 0.01 | 0 | 0 | 0.01 | 1.02 |
| 39 | 0.98 | 0.02 | 0.96 | 0.05 | | 0 | 0.05 | 0 | 0.01 | 0.01 | 0.06 | 0 | 0 | 0 | 0 | 0.01 | 0 | 0.01 | 1.02 |
| 40 | 0.98 | 0.02 | 0.96 | 0.05 | | 0 | 0.05 | 0 | 0.01 | 0.01 | 0.06 | 0 | 0 | 0 | 0 | 0.01 | 0 | 0.01 | 1.02 |
| (3) | | | | | | | | | | | | | | | | | | | |
| 41 | 0.98 | 0.02 | 0.96 | 0.05 | 0 | 0.05 | 0 | 0.01 | 0.01 | 0.06 | 0 | 0 | 0 | 0 | 0 | 0.01 | 0 | 0.01 | 1.02 |
| *42 | 0.98 | 0.02 | 0.96 | 0.01 | 0.01 | 0.02 | 0.04 | 0 | 0.04 | 0.06 | 0 | 0 | 0 | 0 | 0 | 0 | 0.01 | 0.01 | 1.02 |
| 43 | 0.98 | 0.02 | 0.97 | 0 | 0.01 | 0.01 | 0.04 | 0 | 0.04 | 0.05 | 0 | 0 | 0 | 0 | 0 | 0 | 0.01 | 0.01 | 1.02 |
| 44 | 0.98 | 0.02 | 0.97 | 0 | 0.01 | 0.01 | 0.04 | 0 | 0.04 | 0.05 | 0 | 0 | 0 | 0 | 0 | 0 | 0.01 | 0.01 | 1.02 |
| 45 | 0.98 | 0.02 | 0.97 | 0 | 0.01 | 0.01 | 0.04 | 0 | 0.04 | 0.05 | 0 | 0 | 0 | 0 | 0 | 0 | 0.01 | 0.01 | 1.02 |
| 46 | 0.98 | 0.02 | 0.97 | 0 | 0.01 | 0.01 | 0.04 | 0 | 0.04 | 0.05 | 0 | 0 | 0 | 0 | 0 | 0 | 0.01 | 0.01 | 1.02 |
| *47 | 0.98 | 0.02 | 0.97 | 0 | 0.01 | 0.01 | 0.04 | 0 | 0.04 | 0.05 | 0 | 0 | 0 | 0 | 0 | 0 | 0.01 | 0.01 | 1.02 |
| *48 | 0.995 | 0.005 | 0.96 | 0.06 | 0 | 0.06 | 0.02 | 0 | 0.02 | 0.08 | 0 | 0 | 0 | 0.01 | 0 | 0 | 0 | 0.01 | 1.04 |
| 49 | 0.995 | 0.005 | 0.96 | 0.06 | 0 | 0.06 | 0.02 | 0 | 0.02 | 0.08 | 0 | 0 | 0 | 0.01 | 0 | 0 | 0 | 0.01 | 1.04 |
| 50 | 0.995 | 0.005 | 0.96 | 0.06 | 0 | 0.06 | 0.02 | 0 | 0.02 | 0.08 | 0 | 0 | 0 | 0.01 | 0 | 0 | 0 | 0.01 | 1.04 |
| 51 | 0.995 | 0.005 | 0.96 | 0.06 | 0 | 0.06 | 0.02 | 0 | 0.02 | 0.08 | 0 | 0 | 0 | 0.01 | 0 | 0 | 0 | 0.01 | 1.04 |
| 52 | 0.995 | 0.005 | 0.96 | 0.06 | 0 | 0.06 | 0.02 | 0 | 0.02 | 0.08 | 0 | 0 | 0 | 0.01 | 0 | 0 | 0 | 0.01 | 1.04 |
| *53 | 0.995 | 0.005 | 0.96 | 0.06 | 0 | 0.06 | 0.02 | 0 | 0.02 | 0.08 | 0 | 0 | 0 | 0.01 | 0 | 0 | 0 | 0.01 | 1.04 |
| 54 | 0.96 | 0.04 | 0.96 | 0 | 0.04 | 0.04 | 0 | 0.04 | 0.04 | 0.08 | 0 | 0 | 0 | 0.01 | 0 | 0 | 0 | 0 | 1.04 |
| 55 | 0.96 | 0.04 | 0.96 | 0 | 0.04 | 0.04 | 0 | 0.04 | 0.04 | 0.08 | 0 | 0 | 0 | 0 | 0 | 0 | 0.005 | 0.005 | 1.04 |
| 56 | 0.96 | 0.04 | 0.96 | 0 | 0.04 | 0.04 | 0 | 0.04 | 0.04 | 0.08 | 0 | 0 | 0 | 0 | 0 | 0 | 0.01 | 0.01 | 1.04 |
| 57 | 0.96 | 0.04 | 0.96 | 0 | 0.04 | 0.04 | 0 | 0.04 | 0.04 | 0.08 | 0 | 0 | 0 | 0 | 0 | 0 | 0.02 | 0.02 | 1.04 |
| 58 | 0.96 | 0.04 | 0.96 | 0 | 0.04 | 0.04 | 0 | 0.04 | 0.04 | 0.08 | 0 | 0 | 0 | 0 | 0 | 0 | 0.04 | 0.04 | 1.04 |
| *59 | 0.96 | 0.04 | 0.96 | 0 | 0.04 | 0.04 | 0 | 0.04 | 0.04 | 0.08 | 0 | 0 | 0 | 0 | 0 | 0 | 0.06 | 0.06 | 1.04 |
| 60 | 0.96 | 0.04 | 0.96 | 0 | 0.04 | 0.04 | 0 | 0.04 | 0.04 | 0.08 | 0.005 | 0 | 0 | 0 | 0 | 0 | 0 | 0.005 | 1.04 |
| (4) | | | | | | | | | | | | | | | | | | | |
| 61 | 0.96 | 0.04 | 0.96 | 0 | 0.04 | 0.04 | 0 | 0.04 | 0.04 | 0.08 | 0.04 | 0 | 0 | 0 | 0 | 0 | 0 | 0.04 | 1.04 |
| *62 | 0.96 | 0.04 | 0.96 | 0 | 0.04 | 0.04 | 0 | 0.04 | 0.04 | 0.08 | 0.06 | 0 | 0 | 0 | 0 | 0 | 0 | 0.06 | 1.04 |
| 63 | 0.96 | 0.04 | 0.96 | 0 | 0.04 | 0.04 | 0 | 0.04 | 0.04 | 0.08 | 0 | 0.005 | 0 | 0 | 0 | 0 | 0 | 0.005 | 1.04 |
| 64 | 0.96 | 0.04 | 0.96 | 0 | 0.04 | 0.04 | 0 | 0.04 | 0.04 | 0.08 | 0 | 0.04 | 0 | 0 | 0 | 0 | 0 | 0.04 | 1.04 |
| *65 | 0.96 | 0.04 | 0.96 | 0 | 0.04 | 0.04 | 0 | 0.04 | 0.04 | 0.08 | 0 | 0.06 | 0 | 0 | 0 | 0 | 0 | 0.06 | 1.04 |
| 66 | 0.96 | 0.04 | 0.96 | 0 | 0.04 | 0.04 | 0 | 0.04 | 0.04 | 0.08 | 0 | 0 | 0.005 | 0 | 0 | 0 | 0 | 0.005 | 1.04 |
| 67 | 0.96 | 0.04 | 0.96 | 0 | 0.04 | 0.04 | 0 | 0.04 | 0.04 | 0.08 | 0 | 0 | 0.04 | 0 | 0 | 0 | 0 | 0.04 | 1.04 |
| *68 | 0.96 | 0.04 | 0.96 | 0 | 0.04 | 0.04 | 0 | 0.04 | 0.04 | 0.08 | 0 | 0 | 0.06 | 0 | 0 | 0 | 0 | 0.06 | 1.04 |

TABLE 1-continued

| | | | | | Basic Component (100 weight portions) | | | | | | | | | | | | | |
|---|---|---|---|---|---|---|---|---|---|---|---|---|---|---|---|---|---|---|
| | | | | | | | | | | | | | y | | | | | |
| Sample | | | | x | | | z | | x,z | | | | | | | | To- | |
| No | 1-α | α | k-x-z | Mg | Zn | Total | Ca | Sr | Total | Total | Sc | Y | Gd | Dy | Ho | Er | Yb | tal | k |
| 69 | 0.96 | 0.04 | 0.96 | 0 | 0.04 | 0.04 | 0 | 0.04 | 0.04 | 0.08 | 0 | 0 | 0 | 0.005 | 0 | 0 | 0 | 0.005 | 1.04 |
| 70 | 0.96 | 0.04 | 0.96 | 0 | 0.04 | 0.04 | 0 | 0.04 | 0.04 | 0.08 | 0 | 0 | 0 | 0.04 | 0 | 0 | 0 | 0.04 | 1.04 |
| *71 | 0.96 | 0.04 | 0.96 | 0 | 0.04 | 0.04 | 0 | 0.04 | 0.04 | 0.08 | 0 | 0 | 0 | 0.06 | 0 | 0 | 0 | 0.06 | 1.04 |
| 72 | 0.96 | 0.04 | 0.96 | 0 | 0.04 | 0.04 | 0 | 0.04 | 0.04 | 0.08 | 0 | 0 | 0 | 0 | 0.005 | 0 | 0 | 0.005 | 1.04 |
| 73 | 0.96 | 0.04 | 0.96 | 0 | 0.04 | 0.04 | 0 | 0.04 | 0.04 | 0.08 | 0 | 0 | 0 | 0 | 0.04 | 0 | 0 | 0.04 | 1.04 |
| *74 | 0.96 | 0.04 | 0.96 | 0 | 0.04 | 0.04 | 0 | 0.04 | 0.04 | 0.08 | 0 | 0 | 0 | 0 | 0.06 | 0 | 0 | 0.06 | 1.04 |
| 75 | 0.96 | 0.04 | 0.96 | 0 | 0.04 | 0.04 | 0 | 0.04 | 0.04 | 0.08 | 0 | 0 | 0 | 0 | 0 | 0.005 | 0 | 0.005 | 1.04 |
| 76 | 0.96 | 0.04 | 0.96 | 0 | 0.04 | 0.04 | 0 | 0.04 | 0.04 | 0.08 | 0 | 0 | 0 | 0 | 0 | 0.04 | 0 | 0.04 | 1.04 |
| *77 | 0.96 | 0.04 | 0.96 | 0 | 0.04 | 0.04 | 0 | 0.04 | 0.04 | 0.08 | 0 | 0 | 0 | 0 | 0 | 0.06 | 0 | 0.06 | 1.04 |
| *78 | 1.00 | 0 | 0.91 | 0.06 | 0 | 0.6 | 0.02 | 0.02 | 0.04 | 0.10 | 0 | 0 | 0 | 0 | 0 | 0 | 0.02 | 0.02 | 1.01 |
| 79 | 0.995 | 0.005 | 0.91 | 0.06 | 0 | 0.6 | 0.02 | 0.02 | 0.04 | 0.10 | 0 | 0 | 0 | 0 | 0 | 0 | 0.02 | 0.02 | 1.01 |
| 80 | 0.98 | 0.02 | 0.91 | 0.06 | 0 | 0.6 | 0.02 | 0.02 | 0.04 | 0.10 | 0 | 0 | 0 | 0 | 0 | 0 | 0.02 | 0.02 | 1.01 |
| | | | | | | | | | (5) | | | | | | | | | | |
| 81 | 0.96 | 0.04 | 0.91 | 0.06 | 0 | 0.06 | 0.02 | 0.02 | 0.04 | 0.10 | 0 | 0 | 0 | 0 | 0 | 0 | 0.02 | 0.02 | 1.01 |
| *82 | 0.95 | 0.05 | 0.91 | 0.06 | 0 | 0.06 | 0.02 | 0.02 | 0.04 | 0.10 | 0 | 0 | 0 | 0 | 0 | 0 | 0.02 | 0.02 | 1.01 |
| *83 | 1.00 | 0 | 0.97 | 0 | 0.05 | 0.05 | 0.02 | 0 | 0.02 | 0.07 | 0 | 0 | 0 | 0.005 | 0 | 0 | 0 | 0.005 | 1.04 |
| 84 | 0.995 | 0.005 | 0.97 | 0 | 0.05 | 0.05 | 0.02 | 0 | 0.02 | 0.07 | 0 | 0 | 0 | 0.005 | 0 | 0 | 0 | 0.005 | 1.04 |
| 85 | 0.98 | 0.02 | 0.97 | 0 | 0.05 | 0.05 | 0.02 | 0 | 0.02 | 0.07 | 0 | 0 | 0 | 0.005 | 0 | 0 | 0 | 0.005 | 1.04 |
| 86 | 0.96 | 0.04 | 0.97 | 0 | 0.05 | 0.05 | 0.02 | 0 | 0.02 | 0.07 | 0 | 0 | 0 | 0.005 | 0 | 0 | 0 | 0.005 | 1.04 |
| *87 | 0.95 | 0.05 | 0.97 | 0 | 0.05 | 0.05 | 0.02 | 0 | 0.02 | 0.07 | 0 | 0 | 0 | 0.005 | 0 | 0 | 0 | 0.005 | 1.04 |
| *88 | 0.98 | 0.02 | 1.00 | 0 | 0 | 0 | 0 | 0 | 0 | 0 | 0 | 0 | 0 | 0 | 0 | 0 | 0.02 | 0.02 | 1.00 |
| 89 | 0.98 | 0.02 | 0.99 | 0.005 | 0 | 0.005 | 0.005 | 0 | 0.005 | 0.01 | 0 | 0 | 0 | 0 | 0 | 0 | 0.02 | 0.02 | 1.00 |
| 90 | 0.98 | 0.02 | 0.99 | 0.005 | 0 | 0.005 | 0 | 0.005 | 0.005 | 0.01 | 0 | 0 | 0 | 0 | 0 | 0 | 0.02 | 0.02 | 1.00 |
| 91 | 0.98 | 0.02 | 0.99 | 0 | 0.005 | 0.005 | 0.005 | 0 | 0.005 | 0.01 | 0 | 0 | 0 | 0 | 0 | 0 | 0.02 | 0.02 | 1.00 |
| 92 | 0.98 | 0.02 | 0.99 | 0 | 0.005 | 0.005 | 0 | 0.005 | 0.005 | 0.01 | 0 | 0 | 0 | 0 | 0 | 0 | 0.02 | 0.02 | 1.00 |
| 93 | 0.98 | 0.02 | 0.94 | 0.02 | 0.02 | 0.04 | 0.02 | 0 | 0.02 | 0.06 | 0 | 0 | 0 | 0 | 0 | 0 | 0.02 | 0.02 | 1.00 |
| 94 | 0.98 | 0.02 | 0.94 | 0.02 | 0.02 | 0.04 | 0.02 | 0 | 0.02 | 0.06 | 0 | 0 | 0 | 0 | 0 | 0 | 0.02 | 0.02 | 1.00 |
| 95 | 0.98 | 0.02 | 0.94 | 0.02 | 0 | 0.02 | 0.02 | 0.02 | 0.04 | 0.06 | 0 | 0 | 0 | 0 | 0 | 0 | 0.02 | 0.02 | 1.00 |
| 96 | 0.98 | 0.02 | 0.94 | 0 | 0.02 | 0.02 | 0.02 | 0.02 | 0.04 | 0.06 | 0 | 0 | 0 | 0 | 0 | 0 | 0.02 | 0.02 | 1.00 |
| 97 | 0.98 | 0.02 | 0.92 | 0.02 | 0.02 | 0.04 | 0.02 | 0.02 | 0.04 | 0.08 | 0 | 0 | 0 | 0 | 0 | 0 | 0.02 | 0.02 | 1.00 |
| *98 | 0.98 | 0.02 | 0.88 | 0.03 | 0.03 | 0.06 | 0.03 | 0.03 | 0.06 | 0.12 | 0 | 0 | 0 | 0 | 0 | 0 | 0.02 | 0.02 | 1.00 |
| 99 | 0.98 | 0.02 | 0.97 | 0.02 | 0 | 0.02 | 0 | 0.01 | 0.01 | 0.03 | 0 | 0 | 0 | 0 | 0 | 0 | 0.02 | 0.02 | 1.00 |
| 100 | 0.98 | 0.02 | 0.95 | 0.01 | 0 | 0.01 | 0 | 0.01 | 0.04 | 0.05 | 0 | 0 | 0 | 0 | 0 | 0 | 0.02 | 0.02 | 1.00 |
| | | | | | | | | | (6) | | | | | | | | | | |
| 101 | 0.98 | 0.02 | 0.92 | 0.04 | 0 | 0.04 | 0 | 0.04 | 0.04 | 0.08 | 0 | 0 | 0 | 0 | 0 | 0 | 0.02 | 0.02 | 1.00 |
| 102 | 0.98 | 0.02 | 0.90 | 0.05 | 0 | 0.05 | 0 | 0.05 | 0.05 | 0.10 | 0 | 0 | 0 | 0 | 0 | 0 | 0.02 | 0.02 | 1.00 |
| 103 | 0.98 | 0.02 | 0.90 | 0 | 0.1 | 0.1 | 0 | 0 | 0 | 0.10 | 0 | 0 | 0 | 0 | 0 | 0 | 0.02 | 0.02 | 1.00 |
| 104 | 0.98 | 0.02 | 0.88 | 0.06 | 0 | 0.06 | 0.06 | 0 | 0.06 | 0.12 | 0 | 0 | 0 | 0 | 0 | 0 | 0.02 | 0.02 | 1.00 |
| 105 | 0.98 | 0.02 | 0.88 | 0.06 | 0.06 | 0.12 | 0 | 0 | 0 | 0.12 | 0 | 0 | 0 | 0 | 0 | 0 | 0.02 | 0.02 | 1.00 |
| 106 | 0.97 | 0.03 | 0.94 | 0 | 0 | 0 | 0.04 | 0.02 | 0.06 | 0.06 | 0 | 0 | 0 | 0.04 | 0 | 0 | 0 | 0.04 | 1.00 |
| 107 | 0.97 | 0.03 | 0.95 | 0 | 0.05 | 0.05 | 0.05 | 0 | 0.05 | 0.10 | 0 | 0 | 0 | 0.04 | 0 | 0 | 0 | 0.04 | 1.05 |
| 108 | 0.97 | 0.03 | 0.95 | 0.05 | 0 | 0.05 | 0 | 0.05 | 0.05 | 0.10 | 0 | 0 | 0 | 0.04 | 0 | 0 | 0 | 0.04 | 1.05 |
| 109 | 0.97 | 0.03 | 1.00 | 0.02 | 0.01 | 0.03 | 0.01 | 0.01 | 0.02 | 0.05 | 0 | 0 | 0 | 0.04 | 0 | 0 | 0 | 0.04 | 1.05 |
| 110 | 0.97 | 0.03 | 0.97 | 0.03 | 0.01 | 0.04 | 0.03 | 0.01 | 0.04 | 0.08 | 0 | 0 | 0 | 0.04 | 0 | 0 | 0 | 0.04 | 1.05 |
| 111 | 0.97 | 0.03 | 0.95 | 0.03 | 0.02 | 0.05 | 0.03 | 0.02 | 0.05 | 0.10 | 0 | 0 | 0 | 0.04 | 0 | 0 | 0 | 0.04 | 1.05 |
| 112 | 0.97 | 0.03 | 0.93 | 0.03 | 0.03 | 0.06 | 0.03 | 0.03 | 0.06 | 0.12 | 0 | 0 | 0 | 0.04 | 0 | 0 | 0 | 0.04 | 1.05 |
| 113 | 0.98 | 0.02 | 0.94 | 0.02 | 0 | 0.02 | 0.02 | 0 | 0.02 | 0.04 | 0 | 0 | 0 | 0 | 0 | 0 | 0.005 | 0.005 | 0.98 |
| 114 | 0.98 | 0.02 | 0.96 | 0.02 | 0 | 0.02 | 0.02 | 0 | 0.02 | 0.04 | 0 | 0 | 0 | 0 | 0 | 0 | 0.005 | 0.005 | 1.00 |
| 115 | 0.98 | 0.02 | 0.99 | 0.02 | 0 | 0.02 | 0.02 | 0 | 0.02 | 0.04 | 0 | 0 | 0 | 0 | 0 | 0 | 0.005 | 0.005 | 1.03 |
| 116 | 0.98 | 0.02 | 1.01 | 0.02 | 0 | 0.02 | 0.02 | 0 | 0.02 | 0.04 | 0 | 0 | 0 | 0 | 0 | 0 | 0.005 | 0.005 | 1.05 |
| 117 | 0.98 | 0.02 | 1.03 | 0.02 | 0 | 0.02 | 0.02 | 0 | 0.02 | 0.04 | 0 | 0 | 0 | 0 | 0 | 0 | 0.005 | 0.005 | 1.07 |
| 118 | 0.99 | 0.01 | 0.90 | 0.01 | 0.03 | 0.04 | 0.01 | 0.03 | 0.04 | 0.08 | 0 | 0 | 0 | 0.02 | 0 | 0 | 0 | 0.02 | 0.98 |
| 119 | 0.99 | 0.01 | 0.92 | 0.01 | 0.03 | 0.04 | 0.01 | 0.03 | 0.04 | 0.08 | 0 | 0 | 0 | 0.02 | 0 | 0 | 0 | 0.02 | 1.00 |
| 120 | 0.99 | 0.01 | 0.95 | 0.01 | 0.03 | 0.04 | 0.01 | 0.03 | 0.04 | 0.08 | 0 | 0 | 0 | 0.02 | 0 | 0 | 0 | 0.02 | 1.03 |
| | | | | | | | | | (7) | | | | | | | | | | |
| 121 | 0.99 | 0.01 | 0.97 | 0.01 | 0.03 | 0.04 | 0.01 | 0.03 | 0.04 | 0.08 | 0 | 0 | 0 | 0.02 | 0 | 0 | 0 | 0.02 | 1.05 |
| *122 | 0.99 | 0.01 | 0.99 | 0.01 | 0.03 | 0.04 | 0.01 | 0.03 | 0.04 | 0.08 | 0 | 0 | 0 | 0.02 | 0 | 0 | 0 | 0.02 | 1.07 |
| 123 | 0.98 | 0.02 | 0.96 | 0.04 | 0 | 0.04 | 0 | 0.02 | 0.02 | 0.06 | 0 | 0 | 0 | 0.001 | 0 | 0 | 0.001 | 0.002 | 1.02 |
| 124 | 0.98 | 0.02 | 0.96 | 0.04 | 0 | 0.04 | 0 | 0.02 | 0.02 | 0.06 | 0 | 0 | 0 | 0.005 | 0 | 0 | 0.005 | 0.01 | 1.02 |
| 125 | 0.98 | 0.02 | 0.96 | 0.04 | 0 | 0.04 | 0 | 0.02 | 0.02 | 0.06 | 0 | 0 | 0 | 0.01 | 0 | 0 | 0.01 | 0.02 | 1.02 |
| 126 | 0.98 | 0.02 | 0.96 | 0.04 | 0 | 0.04 | 0 | 0.02 | 0.02 | 0.06 | 0 | 0 | 0 | 0.02 | 0 | 0 | 0.02 | 0.04 | 1.02 |
| *127 | 0.98 | 0.02 | 0.96 | 0.04 | 0 | 0.04 | 0 | 0.02 | 0.02 | 0.06 | 0 | 0 | 0 | 0.03 | 0 | 0 | 0.03 | 0.06 | 1.02 |
| 128 | 0.97 | 0.03 | 0.94 | 0 | 0.05 | 0.05 | 0 | 0.05 | 0.05 | 0.10 | 0 | 0 | 0 | 0.03 | 0 | 0 | 0.01 | 0.04 | 1.04 |
| 129 | 0.97 | 0.03 | 0.94 | 0 | 0.05 | 0.05 | 0 | 0.05 | 0.05 | 0.10 | 0 | 0.01 | 0 | 0 | 0 | 0 | 0.01 | 0.02 | 1.04 |
| 130 | 0.97 | 0.03 | 0.94 | 0 | 0.05 | 0.05 | 0 | 0.05 | 0.05 | 0.10 | 0.01 | 0 | 0 | 0 | 0.01 | 0 | 0 | 0.04 | 1.04 |
| 131 | 0.97 | 0.03 | 0.94 | 0 | 0.05 | 0.05 | 0 | 0.05 | 0.05 | 0.10 | 0 | 0.02 | 0 | 0.02 | 0 | 0 | 0 | 0.04 | 1.04 |
| 132 | 0.97 | 0.03 | 0.94 | 0 | 0.05 | 0.05 | 0 | 0.05 | 0.05 | 0.10 | 0 | 0 | 0 | 0 | 0 | 0.03 | 0.01 | 0.04 | 1.04 |
| 133 | 0.97 | 0.03 | 0.94 | 0 | 0.05 | 0.05 | 0 | 0.05 | 0.05 | 0.10 | 0 | 0.01 | 0 | 0.01 | 0 | 0 | 0.01 | 0.03 | 1.04 |
| 134 | 0.97 | 0.03 | 0.94 | 0 | 0.05 | 0.05 | 0 | 0.05 | 0.05 | 0.10 | 0.01 | 0 | 0 | 0.02 | 0 | 0 | 0.01 | 0.04 | 1.04 |
| 135 | 0.97 | 0.03 | 0.94 | 0 | 0.05 | 0.05 | 0 | 0.05 | 0.05 | 0.10 | 0 | 0.005 | 0.005 | 0.01 | 0.01 | 0.01 | 0 | 0.04 | 1.04 |
| 136 | 0.97 | 0.03 | 0.94 | 0 | 0.05 | 0.05 | 0 | 0.05 | 0.05 | 0.10 | 0 | 0.01 | 0 | 0.01 | 0.01 | 0.01 | 0 | 0.04 | 1.04 |
| 137 | 0.97 | 0.03 | 0.94 | 0 | 0.05 | 0.05 | 0 | 0.05 | 0.05 | 0.10 | 0.005 | 0.005 | 0 | 0.005 | 0 | 0.005 | 0.005 | 0.025 | 1.04 |
| 138 | 0.97 | 0.03 | 0.94 | 0 | 0.05 | 0.05 | 0 | 0.05 | 0.05 | 0.10 | 0.002 | 0.005 | 0.003 | 0.005 | 0.005 | 0.005 | 0.005 | 0.03 | 1.04 |
| *139 | 0.97 | 0.03 | 0.94 | 0 | 0.05 | 0.05 | 0 | 0.05 | 0.05 | 0.10 | 0.01 | 0.005 | 0.005 | 0.01 | 0.01 | 0.01 | 0.01 | 0.06 | 1.04 |
| | | | | | | | | | (8) | | | | | | | | | | |
| 140 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |

TABLE 1-continued

| Sample No | 1-α | α | k-x-z | x Mg | Zn | Total | z Ca | Sr | Total | x,z Total | y Sc | Y | Gd | Dy | Ho | Er | Yb | Total | k |
|---|---|---|---|---|---|---|---|---|---|---|---|---|---|---|---|---|---|---|---|
| 141 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 142 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 143 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 144 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 145 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 146 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 147 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 148 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 149 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 150 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 151 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 152 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 153 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 154 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 155 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 156 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 157 | 0.98 | 0.02 | 0.96 | 0.02 | 0.02 | 0.04 | 0.01 | 0.01 | 0.02 | 0.06 | 0 | 0 | 0 | 0 | 0 | 0 | 0.01 | 0.01 | 1.02 |
| 158 | 0.98 | 0.02 | 0.96 | 0.02 | 0.02 | 0.04 | 0.01 | 0.01 | 0.02 | 0.06 (9) | 0 | 0 | 0 | 0 | 0 | 0 | 0.01 | 0.01 | 1.02 |
| *159 | 0.995 | 0.005 | 0.96 | 0.02 | 0.02 | 0.04 | 0.02 | 0.02 | 0.04 | 0.08 | 0 | 0 | 0 | 0 | 0 | 0 | 0.01 | 0.01 | 1.04 |
| 160 | 0.995 | 0.005 | 0.96 | 0.02 | 0.02 | 0.04 | 0.02 | 0.02 | 0.04 | 0.08 | 0 | 0 | 0 | 0 | 0 | 0 | 0.01 | 0.01 | 1.04 |
| 161 | 0.995 | 0.005 | 0.96 | 0.02 | 0.02 | 0.04 | 0.02 | 0.02 | 0.04 | 0.08 | 0 | 0 | 0 | 0 | 0 | 0 | 0.01 | 0.01 | 1.04 |
| 162 | 0.995 | 0.005 | 0.96 | 0.02 | 0.02 | 0.04 | 0.02 | 0.02 | 0.04 | 0.08 | 0 | 0 | 0 | 0 | 0 | 0 | 0.01 | 0.01 | 1.04 |
| 163 | 0.995 | 0.005 | 0.96 | 0.02 | 0.02 | 0.04 | 0.02 | 0.02 | 0.04 | 0.08 | 0 | 0 | 0 | 0 | 0 | 0 | 0.01 | 0.01 | 1.04 |
| *164 | 0.995 | 0.005 | 0.96 | 0.02 | 0.02 | 0.04 | 0.02 | 0.02 | 0.04 | 0.08 | 0 | 0 | 0 | 0 | 0 | 0 | 0.01 | 0.01 | 1.04 |
| *165 | 0.96 | 0.04 | 0.98 | 0.02 | 0.01 | 0.03 | 0.01 | 0.01 | 0.02 | 0.05 | 0 | 0 | 0 | 0.01 | 0 | 0 | 0 | 0.01 | 1.03 |
| 166 | 0.96 | 0.04 | 0.98 | 0.02 | 0.01 | 0.03 | 0.01 | 0.01 | 0.02 | 0.05 | 0 | 0 | 0 | 0.01 | 0 | 0 | 0 | 0.01 | 1.03 |
| 167 | 0.96 | 0.04 | 0.98 | 0.02 | 0.01 | 0.03 | 0.01 | 0.01 | 0.02 | 0.05 | 0 | 0 | 0 | 0.01 | 0 | 0 | 0 | 0.01 | 1.03 |
| 168 | 0.96 | 0.04 | 0.98 | 0.02 | 0.01 | 0.03 | 0.01 | 0.01 | 0.02 | 0.05 | 0 | 0 | 0 | 0.01 | 0 | 0 | 0 | 0.01 | 1.03 |
| 169 | 0.96 | 0.04 | 0.98 | 0.02 | 0.01 | 0.03 | 0.01 | 0.01 | 0.02 | 0.05 | 0 | 0 | 0 | 0.01 | 0 | 0 | 0 | 0.01 | 1.03 |
| *170 | 0.96 | 0.04 | 0.98 | 0.02 | 0.01 | 0.03 | 0.01 | 0.01 | 0.02 | 0.05 | 0 | 0 | 0 | 0.01 | 0 | 0 | 0 | 0.01 | 1.03 |

*marks show compared samples

TABLE 2

| Sample No | Amount weight portions | Composition (mol %) Li$_2$O | SiO$_2$ | MO | Content of MO (mol %) BaO | SrO | CaO | MgO | ZnO |
|---|---|---|---|---|---|---|---|---|---|
| 1 | 2.00 | 1 | 80 | 19 | 20 | 0 | 50 | 30 | 0 |
| 2 | 2.00 | 1 | 39 | 60 | 20 | 0 | 50 | 30 | 0 |
| 3 | 2.00 | 30 | 30 | 40 | 20 | 0 | 50 | 30 | 0 |
| 4 | 2.00 | 50 | 50 | 0 | 0 | 0 | 0 | 0 | 0 |
| 5 | 2.00 | 20 | 80 | 0 | 0 | 0 | 0 | 0 | 0 |
| 6 | 2.00 | 10 | 50 | 40 | 20 | 0 | 50 | 30 | 0 |
| 7 | 2.00 | 30 | 40 | 30 | 20 | 0 | 50 | 30 | 0 |
| 8 | 2.00 | 20 | 60 | 20 | 20 | 0 | 50 | 30 | 0 |
| 9 | 2.00 | 35 | 65 | 0 | 0 | 0 | 0 | 0 | 0 |
| 10 | 2.00 | 1 | 59 | 40 | 20 | 0 | 50 | 30 | 0 |
| *11 | 2.00 | 1 | 85 | 14 | 20 | 0 | 50 | 30 | 0 |
| *12 | 2.00 | 20 | 29 | 51 | 20 | 0 | 50 | 30 | 0 |
| *13 | 2.00 | 50 | 30 | 20 | 20 | 0 | 50 | 30 | 0 |
| *14 | 2.00 | 60 | 30 | 10 | 20 | 0 | 50 | 30 | 0 |
| *15 | 2.00 | 60 | 40 | 0 | 0 | 0 | 0 | 0 | 0 |
| *16 | 2.00 | 10 | 90 | 0 | 0 | 0 | 0 | 0 | 0 |
| 17 | 2.00 | 20 | 60 | 20 | 100 | 0 | 0 | 0 | 0 |
| 18 | 2.00 | 20 | 60 | 20 | 0 | 100 | 0 | 0 | 0 |
| 19 | 2.00 | 20 | 60 | 20 | 0 | 0 | 100 | 0 | 0 |
| 20 | 2.00 | 20 | 60 | 20 | 0 | 0 | 0 | 100 | 0 |
| 21 | 2.00 | 20 | 60 | 20 | 0 | 0 | 0 | 0 | 100 |
| 22 | 2.00 | 20 | 60 | 20 | 20 | 20 | 20 | 20 | 20 |
| 23 | 2.00 | 20 | 60 | 20 | 40 | 10 | 20 | 10 | 20 |
| 24 | 2.00 | 10 | 50 | 40 | 0 | 20 | 0 | 50 | 30 |
| 25 | 2.00 | 20 | 60 | 20 | 0 | 20 | 0 | 50 | 30 |
| 26 | 2.00 | 35 | 65 | 0 | 0 | 0 | 0 | 0 | 0 |
| 27 | 2.00 | 10 | 50 | 40 | 0 | 20 | 0 | 50 | 30 |
| 28 | 2.00 | 20 | 60 | 20 | 0 | 20 | 0 | 50 | 30 |
| 29 | 2.00 | 35 | 65 | 0 | 0 | 0 | 0 | 0 | 0 |
| 30 | 2.00 | 10 | 50 | 40 | 0 | 20 | 0 | 50 | 30 |
| 31 | 2.00 | 20 | 60 | 20 | 0 | 20 | 0 | 50 | 30 |
| 32 | 2.00 | 35 | 65 | 0 | 0 | 0 | 0 | 0 | 0 |
| 33 | 2.00 | 10 | 50 | 40 | 0 | 20 | 0 | 50 | 30 |
| 34 | 2.00 | 20 | 60 | 20 | 0 | 20 | 0 | 50 | 30 |
| 35 | 2.00 | 35 | 65 | 0 | 0 | 0 | 0 | 0 | 0 |
| 36 | 2.00 | 10 | 50 | 40 | 0 | 20 | 0 | 50 | 30 |

TABLE 2-continued

| | Additional Component | | | | | | | | |
|---|---|---|---|---|---|---|---|---|---|
| Sample No | Amount weight portions | Composition (mol %) | | | Content of MO (mol %) | | | | |
| | | Li$_2$O | SiO$_2$ | MO | BaO | SrO | CaO | MgO | ZnO |
| 37 | 2.00 | 20 | 60 | 20 | 0 | 20 | 0 | 50 | 30 |
| 38 | 2.00 | 35 | 65 | 0 | 0 | 0 | 0 | 0 | 0 |
| 39 | 2.00 | 10 | 50 | 40 | 0 | 20 | 0 | 50 | 30 |
| 40 | 2.00 | 20 | 60 | 20 | 0 | 20 | 0 | 50 | 30 |
| 41 | 2.00 | 35 | 65 | 0 | 0 | 0 | 0 | 0 | 0 |
| *42 | 0 | 0 | 0 | 0 | 0 | 0 | 0 | 0 | 0 |
| 43 | 0.2 | 15 | 75 | 10 | 30 | 10 | 10 | 30 | 20 |
| 44 | 1.00 | 15 | 75 | 10 | 30 | 10 | 10 | 30 | 20 |
| 45 | 3.00 | 15 | 75 | 10 | 30 | 10 | 10 | 30 | 20 |
| 46 | 5.00 | 15 | 75 | 10 | 30 | 10 | 10 | 30 | 20 |
| *47 | 7.00 | 15 | 75 | 10 | 30 | 10 | 10 | 30 | 20 |
| *48 | 0 | 0 | 0 | 0 | 0 | 0 | 0 | 0 | 0 |
| 49 | 0.2 | 15 | 40 | 45 | 20 | 20 | 20 | 20 | |
| 50 | 1.00 | 15 | 40 | 45 | 20 | 20 | 20 | 20 | |
| 51 | 3.00 | 15 | 40 | 45 | 20 | 20 | 20 | 20 | |
| 52 | 5.00 | 15 | 40 | 45 | 20 | 20 | 20 | 20 | |
| *53 | 7.00 | 15 | 40 | 45 | 20 | 20 | 20 | 20 | |
| 54 | 1.00 | 30 | 40 | 30 | 0 | 0 | 0 | 100 | 0 |
| 55 | 1.00 | 30 | 40 | 30 | 0 | 0 | 0 | 100 | 0 |
| 56 | 1.00 | 30 | 40 | 30 | 0 | 0 | 0 | 100 | 0 |
| 57 | 1.00 | 30 | 40 | 30 | 0 | 0 | 0 | 100 | 0 |
| 58 | 1.00 | 30 | 40 | 30 | 0 | 0 | 0 | 100 | 0 |
| *59 | 1.00 | 30 | 40 | 30 | 0 | 0 | 0 | 100 | 0 |
| 60 | 1.00 | 30 | 40 | 30 | 0 | 0 | 0 | 100 | 0 |
| 61 | 1.00 | 30 | 40 | 30 | 0 | 0 | 0 | 100 | 0 |
| *62 | 1.00 | 30 | 40 | 30 | 0 | 0 | 0 | 100 | 0 |
| 63 | 1.00 | 30 | 40 | 30 | 0 | 0 | 0 | 100 | 0 |
| 64 | 1.00 | 30 | 40 | 30 | 0 | 0 | 0 | 100 | 0 |
| *65 | 1.00 | 30 | 40 | 30 | 0 | 0 | 0 | 100 | 0 |
| 66 | 1.00 | 30 | 40 | 30 | 0 | 0 | 0 | 100 | 0 |
| 67 | 1.00 | 30 | 40 | 30 | 0 | 0 | 0 | 100 | 0 |
| 68 | 1.00 | 30 | 40 | 30 | 0 | 0 | 0 | 100 | 0 |
| 69 | 1.00 | 30 | 40 | 30 | 0 | 0 | 0 | 100 | 0 |
| 70 | 1.00 | 30 | 40 | 30 | 0 | 0 | 0 | 100 | 0 |
| *71 | 1.00 | 30 | 40 | 30 | 0 | 0 | 0 | 100 | 0 |
| 72 | 1.00 | 30 | 40 | 30 | 0 | 0 | 0 | 100 | 0 |
| 73 | 1.00 | 30 | 40 | 30 | 0 | 0 | 0 | 100 | 0 |
| *74 | 1.00 | 30 | 40 | 30 | 0 | 0 | 0 | 100 | 0 |
| 75 | 1.00 | 30 | 40 | 30 | 0 | 0 | 0 | 100 | 0 |
| 76 | 1.00 | 30 | 40 | 30 | 0 | 0 | 0 | 100 | 0 |
| *77 | 1.00 | 30 | 40 | 30 | 0 | 0 | 0 | 100 | 0 |
| *78 | 3.00 | 10 | 50 | 40 | 20 | 20 | 20 | 20 | 20 |
| 79 | 3.00 | 10 | 50 | 40 | 20 | 20 | 20 | 20 | 20 |
| 80 | 3.00 | 10 | 50 | 40 | 20 | 20 | 20 | 20 | 20 |
| 81 | 3.00 | 10 | 50 | 40 | 20 | 20 | 20 | 20 | 20 |
| *82 | 3.00 | 10 | 50 | 40 | 20 | 20 | 20 | 20 | 20 |
| *83 | 1.00 | 20 | 60 | 20 | 0 | 100 | 0 | 0 | 0 |
| 84 | 1.00 | 20 | 60 | 20 | 0 | 100 | 0 | 0 | 0 |
| 85 | 1.00 | 20 | 60 | 20 | 0 | 100 | 0 | 0 | 0 |
| 86 | 1.00 | 20 | 60 | 20 | 0 | 100 | 0 | 0 | 0 |
| *87 | 1.00 | 20 | 60 | 20 | 0 | 100 | 0 | 0 | 0 |
| *88 | 0.50 | 30 | 40 | 30 | 0 | 0 | 0 | 100 | 0 |
| 89 | 0.50 | 30 | 40 | 30 | 0 | 0 | 0 | 100 | 0 |
| 90 | 0.50 | 30 | 40 | 30 | 0 | 0 | 0 | 100 | 0 |
| 91 | 0.50 | 30 | 40 | 30 | 0 | 0 | 0 | 100 | 0 |
| 92 | 0.50 | 30 | 40 | 30 | 0 | 0 | 0 | 100 | 0 |
| 93 | 0.50 | 30 | 40 | 30 | 0 | 0 | 0 | 100 | 0 |
| 94 | 0.50 | 30 | 40 | 30 | 0 | 0 | 0 | 100 | 0 |
| 95 | 0.50 | 30 | 40 | 30 | 0 | 0 | 0 | 100 | 0 |
| 96 | 0.50 | 30 | 40 | 30 | 0 | 0 | 0 | 100 | 0 |
| 97 | 0.50 | 30 | 40 | 30 | 0 | 0 | 0 | 100 | 0 |
| *98 | 0.50 | 30 | 40 | 30 | 0 | 0 | 0 | 100 | 0 |
| 99 | 0.50 | 30 | 40 | 30 | 0 | 0 | 0 | 100 | 0 |
| 100 | 0.50 | 30 | 40 | 30 | 0 | 0 | 0 | 100 | 0 |
| 101 | 0.50 | 30 | 40 | 30 | 0 | 0 | 0 | 100 | 0 |
| 102 | 0.50 | 30 | 40 | 30 | 0 | 0 | 0 | 100 | 0 |
| 103 | 0.50 | 30 | 40 | 30 | 0 | 0 | 0 | 100 | 0 |
| *104 | 0.50 | 30 | 40 | 30 | 0 | 0 | 0 | 100 | 0 |
| *105 | 0.50 | 30 | 40 | 30 | 0 | 0 | 0 | 100 | 0 |
| *106 | 0.50 | 30 | 40 | 30 | 0 | 0 | 0 | 100 | 0 |
| 107 | 3.00 | 35 | 55 | 10 | 100 | 0 | 0 | 0 | 0 |
| 108 | 3.00 | 35 | 55 | 10 | 100 | 0 | 0 | 0 | 0 |
| 109 | 3.00 | 35 | 55 | 10 | 100 | 0 | 0 | 0 | 0 |
| 110 | 3.00 | 35 | 55 | 10 | 100 | 0 | 0 | 0 | 0 |
| 111 | 3.00 | 35 | 55 | 10 | 100 | 0 | 0 | 0 | 0 |
| *112 | 3.00 | 35 | 55 | 10 | 100 | 0 | 0 | 0 | 0 |
| *113 | 1.00 | 10 | 50 | 40 | 20 | 20 | 20 | 20 | 20 |

TABLE 2-continued

| Sample No | Amount weight portions | Composition (mol %) | | | Content of MO (mol %) | | | | |
|---|---|---|---|---|---|---|---|---|---|
| | | Li₂O | SiO₂ | MO | BaO | SrO | CaO | MgO | ZnO |
| 114 | 1.00 | 10 | 50 | 40 | 20 | 20 | 20 | 20 | 20 |
| 115 | 1.00 | 10 | 50 | 40 | 20 | 20 | 20 | 20 | 20 |
| 116 | 1.00 | 10 | 50 | 40 | 20 | 20 | 20 | 20 | 20 |
| *117 | 1.00 | 10 | 50 | 40 | 20 | 20 | 20 | 20 | 20 |
| *118 | 2.00 | 15 | 75 | 10 | 0 | 0 | 100 | 0 | 0 |
| 119 | 2.00 | 15 | 75 | 10 | 0 | 0 | 100 | 0 | 0 |
| 120 | 2.00 | 15 | 75 | 10 | 0 | 0 | 100 | 0 | 0 |
| 121 | 2.00 | 15 | 75 | 10 | 0 | 0 | 100 | 0 | 0 |
| *122 | 2.00 | 15 | 75 | 10 | 0 | 0 | 100 | 0 | 0 |
| 123 | 0.50 | 30 | 55 | 15 | 20 | 20 | 20 | 20 | 20 |
| 124 | 0.50 | 30 | 55 | 15 | 20 | 20 | 20 | 20 | 20 |
| 125 | 0.50 | 30 | 55 | 15 | 20 | 20 | 20 | 20 | 20 |
| 126 | 0.50 | 30 | 55 | 15 | 20 | 20 | 20 | 20 | 20 |
| *127 | 0.50 | 30 | 55 | 15 | 20 | 20 | 20 | 20 | 20 |
| 128 | 5.00 | 35 | 40 | 25 | 20 | 0 | 30 | 50 | 0 |
| 129 | 5.00 | 35 | 40 | 25 | 20 | 0 | 30 | 50 | 0 |
| 130 | 5.00 | 35 | 40 | 25 | 20 | 0 | 30 | 50 | 0 |
| 131 | 5.00 | 35 | 40 | 25 | 20 | 0 | 30 | 50 | 0 |
| 132 | 5.00 | 35 | 40 | 25 | 20 | 0 | 30 | 50 | 0 |
| 133 | 5.00 | 35 | 40 | 25 | 20 | 0 | 30 | 50 | 0 |
| 134 | 5.00 | 35 | 40 | 25 | 20 | 0 | 30 | 50 | 0 |
| 135 | 5.00 | 35 | 40 | 25 | 20 | 0 | 30 | 50 | 0 |
| 136 | 5.00 | 35 | 40 | 25 | 20 | 0 | 30 | 50 | 0 |
| 137 | 5.00 | 35 | 40 | 25 | 20 | 0 | 30 | 50 | 0 |
| 138 | 5.00 | 35 | 40 | 25 | 20 | 0 | 30 | 50 | 0 |
| *139 | 5.00 | 35 | 40 | 25 | 20 | 0 | 30 | 50 | 0 |
| 140 | 2.00 | 1 | 80 | 19 | 20 | 0 | 50 | 30 | 0 |
| 141 | 2.00 | 1 | 39 | 60 | 20 | 0 | 50 | 30 | 0 |
| 142 | 2.00 | 30 | 0 | 70 | 20 | 0 | 50 | 30 | 0 |
| 143 | 2.00 | 90 | 0 | 10 | 20 | 0 | 50 | 30 | 0 |
| 144 | 2.00 | 90 | 10 | 0 | 0 | 0 | 0 | 0 | 0 |
| 145 | 2.00 | 20 | 80 | 0 | 0 | 0 | 0 | 0 | 0 |
| 146 | 2.00 | 15 | 30 | 55 | 20 | 0 | 50 | 30 | 0 |
| 147 | 2.00 | 45 | 15 | 40 | 20 | 0 | 50 | 30 | 0 |
| 148 | 2.00 | 20 | 50 | 30 | 20 | 0 | 50 | 30 | 0 |
| 149 | 2.00 | 50 | 30 | 20 | 20 | 0 | 50 | 30 | 0 |
| *150 | 2.00 | 10 | 20 | 70 | 20 | 0 | 50 | 30 | 0 |
| *151 | 2.00 | 95 | 5 | 0 | 0 | 0 | 0 | 0 | 0 |
| *152 | 2.00 | 10 | 85 | 5 | 20 | 0 | 50 | 30 | 0 |
| 153 | 2.00 | 20 | 50 | 30 | 100 | 0 | 0 | 0 | 0 |
| 154 | 2.00 | 20 | 50 | 30 | 0 | 100 | 0 | 0 | 0 |
| 155 | 2.00 | 20 | 50 | 30 | 0 | 0 | 100 | 0 | 0 |
| 156 | 2.00 | 20 | 50 | 30 | 0 | 0 | 0 | 100 | 0 |
| 157 | 2.00 | 20 | 50 | 30 | 0 | 0 | 0 | 0 | 100 |
| 158 | 2.00 | 20 | 50 | 30 | 20 | 20 | 20 | 20 | 20 |
| *159 | 0 | 0 | 0 | 0 | 0 | 0 | 0 | 0 | 0 |
| 160 | 0.20 | 15 | 75 | 10 | 0 | 50 | 0 | 50 | 0 |
| 161 | 1.00 | 15 | 75 | 10 | 0 | 50 | 0 | 50 | 0 |
| 162 | 3.00 | 15 | 75 | 10 | 0 | 50 | 0 | 50 | 0 |
| 163 | 5.00 | 15 | 75 | 10 | 0 | 50 | 0 | 50 | 0 |
| *164 | 7.00 | 15 | 75 | 10 | 0 | 50 | 0 | 50 | 0 |
| *165 | 0 | 0 | 0 | 0 | 0 | 0 | 0 | 0 | 0 |
| 166 | 0.20 | 45 | 15 | 40 | 20 | 20 | 20 | 20 | 20 |
| 167 | 1.00 | 45 | 15 | 40 | 20 | 20 | 20 | 20 | 20 |
| 168 | 3.00 | 45 | 15 | 40 | 20 | 20 | 20 | 20 | 20 |
| 169 | 5.00 | 45 | 15 | 40 | 20 | 20 | 20 | 20 | 20 |
| *170 | 7.00 | 45 | 15 | 40 | 20 | 20 | 20 | 20 | 20 |

*marks show compared samples

TABLE 3

| Sample No. | Temperature of firing (°C.) | Electric Characteristics | | | | | | |
|---|---|---|---|---|---|---|---|---|
| | | ε s | tan δ (%) | Resistivity ρ (MΩ · cm) | Change rates by temperature changes ΔC. (%) | | | |
| | | | | | ΔC₋₅₅ | ΔC₁₂₅ | ΔC₋₂₅ | ΔC₈₅ |
| 1 | 1150 | 3800 | 1.0 | 6.2 × 10⁶ | −9.5 | 4.0 | −5.0 | −5.6 |
| 2 | 1150 | 3790 | 1.0 | 7.9 × 10⁶ | −8.4 | 2.1 | −3.5 | −6.7 |
| 3 | 1140 | 3810 | 0.9 | 5.4 × 10⁶ | −9.2 | 5.0 | −5.1 | −4.7 |
| 4 | 1150 | 3820 | 1.1 | 5.3 × 10⁶ | −10.5 | 5.8 | −5.8 | −3.9 |
| 5 | 1130 | 3800 | 1.1 | 5.1 × 10⁶ | −10.4 | 6.5 | −5.7 | −3.8 |
| 6 | 1140 | 3850 | 1.0 | 5.5 × 10⁶ | −9.4 | 3.5 | −5.1 | −5.2 |
| 7 | 1130 | 3840 | 0.9 | 4.7 × 10⁶ | −9.8 | 4.4 | −5.1 | −5.3 |
| 8 | 1120 | 3740 | 1.0 | 6.4 × 10⁶ | −10.0 | 5.9 | −5.2 | −4.5 |
| 9 | 1160 | 3850 | 0.9 | 5.0 × 10⁶ | −10.5 | 5.3 | −5.7 | −3.2 |
| 10 | 1130 | 3750 | 1.0 | 4.8 × 10⁶ | −10.0 | 4.0 | −5.4 | −5.6 |

TABLE 3-continued

| Sample No. | Temperature of firing (°C.) | εs | tan δ (%) | Resistivity ρ (MΩ·cm) | $\Delta C_{-55}$ | $\Delta C_{125}$ | $\Delta C_{-25}$ | $\Delta C_{85}$ |
|---|---|---|---|---|---|---|---|---|
| *11 | 1250 | | | A dense sintered material can not be obtained | | | | |
| *12 | 1250 | | | A dense sintered material can not be obtained | | | | |
| *13 | 1250 | | | A dense sintered material can not be obtained | | | | |
| *14 | 1250 | | | A dense sintered material can not be obtained | | | | |
| *15 | 1250 | | | A dense sintered material can not be obtained | | | | |
| *16 | 1250 | | | A dense sintered material can not be obtained | | | | |
| 17 | 1140 | 3810 | 0.9 | $5.9 \times 10^6$ | | | | |
| 18 | 1140 | 3760 | 0.9 | $6.7 \times 10^6$ | −9.9 | 3.8 | −6.2 | −5.5 |
| 19 | 1140 | 3780 | 1.0 | $6.9 \times 10^6$ | −10.5 | 5.1 | −5.6 | −4.7 |
| 20 | 1130 | 3810 | 1.1 | $6.9 \times 10^6$ | −10.4 | 5.3 | −5.5 | −4.6 |
| 21 | 1140 | 3790 | 1.0 | $6.5 \times 10^6$ | −10.6 | 4.0 | −5.6 | −4.9 |
| 22 | 1130 | 3800 | 0.8 | $6.2 \times 10^6$ | −10.1 | 6.0 | −5.2 | −5.0 |
| 23 | 1130 | 3830 | 1.0 | $6.0 \times 10^6$ | −10.2 | 5.1 | −5.6 | −4.5 |
| 24 | 1150 | 3840 | 1.0 | $5.3 \times 10^6$ | −9.5 | 3.8 | −5.0 | −6.0 |
| 25 | 1150 | 3800 | 1.1 | $5.2 \times 10^6$ | −9.2 | 5.1 | −5.7 | −4.5 |
| 26 | 1150 | 3860 | 0.9 | $6.4 \times 10^6$ | −9.1 | 6.0 | −3.8 | −5.7 |
| 27 | 1130 | 3780 | 0.9 | $6.0 \times 10^6$ | −9.6 | 3.5 | −5.0 | −4.2 |
| 28 | 1140 | 3800 | 1.0 | $5.4 \times 10^6$ | −9.8 | 2.3 | −4.9 | −4.4 |
| 29 | 1130 | 3810 | 1.1 | $4.7 \times 10^6$ | −9.1 | 4.9 | −5.7 | −5.5 |
| 30 | 1140 | 3900 | 0.9 | $6.9 \times 10^6$ | −9.5 | 6.0 | −4.6 | −4.9 |
| 31 | 1150 | 3810 | 1.0 | $8.7 \times 10^6$ | −9.6 | 3.9 | −4.2 | −5.2 |
| 32 | 1140 | 3860 | 1.0 | $6.0 \times 10^6$ | −9.8 | 2.0 | −5.5 | −4.3 |
| 33 | 1150 | 3890 | 1.0 | $5.4 \times 10^6$ | −9.7 | 6.1 | −4.7 | −4.2 |
| 34 | 1140 | 3820 | 1.0 | $8.2 \times 10^6$ | −9.8 | 3.7 | −4.5 | −5.0 |
| 35 | 1140 | 3830 | 1.1 | $4.7 \times 10^6$ | −9.7 | 2.4 | −5.6 | −3.9 |
| 36 | 1150 | 3790 | 0.9 | $6.5 \times 10^6$ | −9.9 | 4.8 | −5.1 | −4.9 |
| 37 | 1130 | 3780 | 0.9 | $5.7 \times 10^6$ | −10.5 | 1.8 | −4.0 | −4.3 |
| 38 | 1130 | 3790 | 1.0 | $4.9 \times 10^6$ | −9.7 | 3.8 | −4.9 | −4.1 |
| 39 | 1140 | 3870 | 0.9 | $5.3 \times 10^6$ | −10.1 | 2.1 | −3.7 | −4.6 |
| 40 | 1130 | 3850 | 1.0 | $6.0 \times 10^6$ | −10.2 | 4.7 | −3.4 | −4.1 |
| 41 | 1130 | 3850 | 0.9 | $4.5 \times 10^6$ | −10.3 | 3.5 | −3.4 | −4.6 |
| *42 | 1250 | | | A dense sintered material can not be obtained | | | | |
| 43 | 1190 | 4410 | 1.3 | $2.2 \times 10^6$ | −10.0 | 3.2 | −5.2 | −4.6 |
| 44 | 1160 | 4050 | 1.1 | $3.5 \times 10^6$ | −9.5 | 3.7 | −5.1 | −4.1 |
| 45 | 1130 | 3430 | 0.9 | $6.6 \times 10^6$ | −11.0 | 0.6 | −6.0 | −6.6 |
| 46 | 1080 | 3110 | 1.4 | $3.8 \times 10^6$ | −12.0 | −2.0 | −7.2 | −8.5 |
| *47 | 1060 | 2750 | 1.6 | $2.2 \times 10^6$ | −16.8 | −4.5 | −9.6 | −12.1 |
| *48 | 1250 | | | A dense sintered material can not be obtained | | | | |
| 49 | 1180 | 4380 | 0.9 | $4.9 \times 10^6$ | −11.7 | 6.9 | −8.0 | −2.1 |
| 50 | 1170 | 4100 | 0.9 | $6.8 \times 10^6$ | −11.5 | 7.5 | −8.2 | −0.5 |
| 51 | 1150 | 3600 | 1.1 | $7.7 \times 10^6$ | −12.5 | 4.5 | −8.3 | −3.1 |
| 52 | 1100 | 3070 | 1.6 | $4.7 \times 10^6$ | −13.5 | 1.9 | −9.3 | −5.5 |
| *53 | 1080 | 2850 | 1.7 | $2.6 \times 10^6$ | −18.2 | −1.7 | −9.9 | −6.3 |
| 54 | 1170 | 3900 | 1.2 | $2.5 \times 10^6$ | −9.9 | 3.4 | −5.8 | −4.7 |
| 55 | 1150 | 4050 | 1.1 | $3.5 \times 10^6$ | −9.2 | 3.8 | −5.0 | −3.7 |
| 56 | 1120 | 4110 | 1.0 | $5.2 \times 10^6$ | −9.1 | 3.8 | −3.8 | −3.6 |
| 57 | 1080 | 4150 | 1.0 | $6.9 \times 10^6$ | −7.6 | 3.9 | −4.2 | −2.5 |
| 58 | 1150 | 3900 | 1.2 | $2.6 \times 10^6$ | −9.0 | 3.7 | −5.0 | −3.8 |
| *59 | 1250 | | | A dense sintered material can not be obtained | | | | |
| 60 | 1130 | 4030 | 1.0 | $2.8 \times 10^6$ | −9.2 | 3.8 | −4.3 | −4.0 |
| 61 | 1160 | 3900 | 1.1 | $3.0 \times 10^6$ | −9.1 | 4.4 | −4.9 | −3.3 |
| *62 | 1250 | | | A dense sintered material can not be obtained | | | | |
| 63 | 1120 | 4010 | 0.9 | $3.1 \times 10^6$ | −8.9 | 3.5 | −4.2 | −4.0 |
| 64 | 1160 | 3970 | 1.0 | $3.0 \times 10^6$ | −9.3 | 3.8 | −4.3 | −4.2 |
| *65 | 1250 | | | A dense sintered material can not be obtained | | | | |
| 66 | 1130 | 4010 | 0.9 | $4.0 \times 10^6$ | −9.0 | 3.8 | −4.2 | −3.7 |
| 67 | 1160 | 3980 | 1.1 | $2.9 \times 10^6$ | −9.2 | 3.7 | −4.4 | −3.7 |
| *68 | 1250 | | | A dense sintered material can not be obtained | | | | |
| 69 | 1130 | 3980 | 1.1 | $4.1 \times 10^6$ | −9.0 | 3.8 | −4.4 | −3.4 |
| 70 | 1160 | 3990 | 0.9 | $2.2 \times 10^6$ | −8.9 | 3.7 | −4.2 | −3.3 |
| *71 | 1250 | | | A dense sintered material can not be obtained | | | | |
| 72 | 1160 | 4010 | 1.1 | $3.3 \times 10^6$ | −8.5 | 7.5 | −4.6 | −4.2 |
| 73 | 1160 | 3960 | 1.0 | $2.9 \times 10^6$ | −8.6 | 8.6 | −5.0 | −3.8 |
| *74 | 1250 | | | A dense sintered material can not be obtained | | | | |
| 75 | 1160 | 3970 | 1.0 | $4.0 \times 10^6$ | −8.6 | 2.7 | −4.9 | −3.7 |
| 76 | 1150 | 3910 | 1.1 | $2.7 \times 10^6$ | −8.8 | 4.4 | −4.2 | −3.6 |
| *77 | 1250 | | | A dense sintered material can not be obtained | | | | |
| *78 | 1160 | 3790 | 1.1 | $8.4 \times 10^6$ | −18.8 | 10.0 | −11.5 | 4.2 |
| 79 | 1130 | 3800 | 0.9 | $9.2 \times 10^6$ | −12.8 | 5.3 | −8.0 | −2.3 |
| 80 | 1120 | 3800 | 1.1 | $7.5 \times 10^6$ | −10.1 | 3.1 | −1.5 | −5.5 |
| 81 | 1120 | 3940 | 0.9 | $7.0 \times 10^6$ | −3.8 | −3.0 | −2.0 | −8.4 |
| *82 | 1130 | 3830 | 0.9 | $6.9 \times 10^6$ | 1.6 | −7.4 | −0.3 | −12.2 |
| *83 | 1180 | 4010 | 1.0 | $6.8 \times 10^6$ | −16.5 | 7.9 | −11.3 | 4.5 |
| 84 | 1170 | 4040 | 1.0 | $7.2 \times 10^6$ | −13.9 | 4.0 | −8.9 | −1.8 |
| 85 | 1160 | 4010 | 1.0 | $8.0 \times 10^6$ | −8.0 | −1.0 | −1.4 | −5.0 |
| 86 | 1170 | 4000 | 0.9 | $5.7 \times 10^6$ | −1.4 | −6.2 | −0.5 | −7.6 |
| *87 | 1160 | 4060 | 1.0 | $6.4 \times 10^6$ | 4.8 | −11.9 | 0.8 | −11.1 |

TABLE 3-continued

| | | | | Electric Characteristics | | | | |
|---|---|---|---|---|---|---|---|---|
| Sample No. | Temperature of firing (°C.) | $\epsilon s$ | tan δ (%) | Resistivity $\rho$ (MΩ·cm) | Change rates by temperature changes ΔC. (%) | | | |
| | | | | | $\Delta C_{-55}$ | $\Delta C_{125}$ | $\Delta C_{-25}$ | $\Delta C_{85}$ |
| *88 | 1160 | 3740 | 1.5 | $4.4 \times 10^6$ | −16.0 | 7.4 | −16.8 | −3.1 |
| 89 | 1160 | 4110 | 1.0 | $8.6 \times 10^6$ | −12.0 | 8.5 | −7.7 | −5.8 |
| 90 | 1140 | 4210 | 1.2 | $4.5 \times 10^6$ | −12.4 | 5.5 | −7.9 | −4.5 |
| 91 | 1150 | 3550 | 1.1 | $5.5 \times 10^6$ | −10.0 | 0.9 | −7.9 | −4.7 |
| 92 | 1160 | 3600 | 1.1 | $4.1 \times 10^6$ | −10.1 | −0.1 | −7.0 | −5.6 |
| 93 | 1150 | 3810 | 1.1 | $5.7 \times 10^6$ | −10.4 | 0.9 | −5.5 | −1.2 |
| 94 | 1160 | 3790 | 1.1 | $5.6 \times 10^6$ | −10.1 | 1.5 | −7.0 | −2.4 |
| 95 | 1150 | 3820 | 1.1 | $6.9 \times 10^6$ | −11.1 | 1.7 | −7.2 | −3.0 |
| 96 | 1150 | 3720 | 0.9 | $4.8 \times 10^6$ | −12.5 | 1.6 | −7.3 | −3.5 |
| 97 | 1170 | 3590 | 1.1 | $4.7 \times 10^6$ | −10.1 | 0.8 | −7.2 | −2.8 |
| *98 | 1140 | 3110 | 1.2 | $4.5 \times 10^6$ | −13.0 | −0.7 | −8.3 | −10.3 |
| 99 | 1160 | 4000 | 0.9 | $6.9 \times 10^6$ | −11.2 | 5.3 | −5.5 | −3.4 |
| 100 | 1160 | 3920 | 1.4 | $4.5 \times 10^6$ | −10.0 | 4.7 | −5.4 | −4.5 |
| 101 | 1160 | 3840 | 1.0 | $7.8 \times 10^6$ | −9.9 | 3.5 | −5.4 | −6.5 |
| 102 | 1200 | 3720 | 0.8 | $9.5 \times 10^6$ | −10.1 | 1.7 | −5.5 | −8.0 |
| 103 | 1180 | 3530 | 1.3 | $8.4 \times 10^6$ | −11.6 | 2.0 | −7.0 | −7.4 |
| *104 | 1190 | 3800 | 0.9 | $9.0 \times 10^6$ | −10.2 | −2.0 | −5.2 | −11.3 |
| *105 | 1170 | 3520 | 1.6 | $2.7 \times 10^6$ | −12.2 | −3.0 | −8.0 | −11.2 |
| *106 | 1150 | 3610 | 1.6 | $2.1 \times 10^6$ | −13.2 | −4.7 | −8.0 | −10.5 |
| 107 | 1130 | 3860 | 1.1 | $2.0 \times 10^6$ | −11.5 | 6.8 | −8.7 | 3.1 |
| 108 | 1140 | 3570 | 1.6 | $2.0 \times 10^6$ | −11.4 | 4.7 | −9.0 | 4.6 |
| 109 | 1130 | 3620 | 1.1 | $3.9 \times 10^6$ | −3.4 | 3.0 | −1.9 | −6.7 |
| 110 | 1180 | 3380 | 1.0 | $4.5 \times 10^6$ | −3.0 | 2.2 | −1.2 | −7.7 |
| 111 | 1170 | 3300 | 0.9 | $6.1 \times 10^6$ | −3.2 | −1.3 | −0.7 | −9.0 |
| *112 | 1180 | 3210 | 1.1 | $3.8 \times 10^6$ | −3.2 | −3.7 | −1.4 | −11.0 |
| *113 | 1130 | 3100 | 2.4 | $6.1 \times 10^4$ | −20.2 | −12.4 | −15.0 | −7.9 |
| 114 | 1160 | 3750 | 0.9 | $4.7 \times 10^6$ | −12.0 | 7.4 | −6.2 | −4.0 |
| 115 | 1160 | 3670 | 0.8 | $3.9 \times 10^6$ | −10.4 | 6.9 | −6.7 | −3.8 |
| 116 | 1180 | 3550 | 1.1 | $6.6 \times 10^6$ | −9.4 | 3.0 | −5.1 | −4.9 |
| *117 | 1250 | | | A dense sintered material can not be obtained | | | | |
| *118 | 1120 | 3110 | 3.5 | $6.5 \times 10^4$ | −21.1 | −10.1 | −15.1 | −9.2 |
| 119 | 1150 | 3640 | 1.0 | $7.2 \times 10^6$ | −12.0 | 5.7 | −7.5 | −3.0 |
| 120 | 1140 | 3690 | 0.9 | $7.1 \times 10^6$ | −11.5 | 3.2 | −7.1 | −3.6 |
| 121 | 1180 | 3590 | 1.0 | $8.9 \times 10^6$ | −9.7 | 1.9 | −7.2 | −3.0 |
| *122 | 1250 | | | A dense sintered material can not be obtained | | | | |
| 123 | 1150 | 3760 | 0.9 | $2.1 \times 10^6$ | −10.1 | −0.5 | −5.1 | −6.6 |
| 124 | 1140 | 3880 | 1.0 | $3.8 \times 10^6$ | −9.5 | −0.7 | −4.3 | −5.6 |
| 125 | 1120 | 4010 | 0.9 | $4.7 \times 10^6$ | −8.7 | −0.1 | −3.4 | −5.1 |
| 126 | 1150 | 3720 | 0.9 | $3.2 \times 10^6$ | −9.4 | −0.5 | −4.8 | −6.2 |
| *127 | 1250 | | | A dense sintered material can not be obtained | | | | |
| 128 | 1150 | 3790 | 1.1 | $4.2 \times 10^6$ | −3.4 | −2.2 | −0.8 | −6.5 |
| 129 | 1130 | 4010 | 1.0 | $7.7 \times 10^6$ | −3.1 | −2.0 | −0.7 | −6.9 |
| 130 | 1130 | 4000 | 1.0 | $5.4 \times 10^6$ | −3.0 | −2.1 | −1.0 | −6.4 |
| 131 | 1140 | 3770 | 1.0 | $3.9 \times 10^6$ | −3.7 | −3.1 | −1.6 | −8.2 |
| 132 | 1160 | 3720 | 0.9 | $3.7 \times 10^6$ | −3.4 | −2.9 | −1.6 | −7.7 |
| 133 | 1140 | 3880 | 0.9 | $5.4 \times 10^6$ | −3.2 | −2.1 | −1.0 | −7.4 |
| 134 | 1150 | 3810 | 1.0 | $3.0 \times 10^6$ | −3.8 | −3.1 | −1.5 | −7.8 |
| 135 | 1160 | 3790 | 1.0 | $3.1 \times 10^6$ | −3.9 | −2.7 | −1.7 | −7.5 |
| 136 | 1150 | 3750 | 0.9 | $2.8 \times 10^6$ | −3.3 | −3.6 | −1.2 | −8.3 |
| 137 | 1120 | 4010 | 0.9 | $4.1 \times 10^6$ | −3.4 | −2.4 | −1.1 | −7.2 |
| 138 | 1140 | 3890 | 0.9 | $5.9 \times 10^6$ | −3.2 | −2.6 | −1.2 | −7.3 |
| *139 | 1250 | | | A dense sintered material can not be obtained | | | | |
| 140 | 1140 | 3610 | 1.0 | $4.5 \times 10^6$ | −9.7 | 4.9 | −6.6 | −3.2 |
| 141 | 1130 | 3590 | 0.9 | $5.0 \times 10^6$ | −10.1 | 3.7 | −3.7 | −4.0 |
| 142 | 1110 | 3570 | 0.9 | $5.3 \times 10^6$ | −8.7 | 3.4 | −3.8 | −3.4 |
| 143 | 1100 | 3500 | 1.0 | $5.4 \times 10^6$ | −10.5 | 6.0 | −5.7 | −1.6 |
| 144 | 1100 | 3490 | 0.9 | $4.9 \times 10^6$ | −10.7 | 6.3 | −5.1 | −1.1 |
| 145 | 1110 | 3570 | 0.9 | $2.7 \times 10^6$ | −10.5 | 5.5 | −4.3 | −2.1 |
| 146 | 1130 | 3700 | 1.1 | $5.1 \times 10^6$ | −10.3 | 2.9 | −5.0 | −5.3 |
| 147 | 1110 | 3630 | 0.8 | $4.1 \times 10^6$ | −9.1 | 3.2 | −5.3 | −5.5 |
| 148 | 1120 | 3590 | 0.9 | $5.0 \times 10^6$ | −9.0 | 3.1 | −5.2 | −5.3 |
| 149 | 1120 | 3580 | 0.8 | $3.8 \times 10^6$ | −10.1 | 3.7 | −7.0 | −1.7 |
| *150 | 1250 | | | A dense sintered material can not be obtained | | | | |
| *151 | 1250 | | | A dense sintered material can not be obtained | | | | |
| *152 | 1250 | | | A dense sintered material can not be obtained | | | | |
| 153 | 1120 | 3610 | 0.9 | $6.0 \times 10^6$ | −8.5 | 3.2 | −4.5 | −3.7 |
| 154 | 1120 | 3590 | 0.9 | $4.5 \times 10^6$ | −9.8 | 2.6 | −4.1 | −4.9 |
| 155 | 1120 | 3700 | 1.0 | $5.6 \times 10^6$ | −10.0 | 2.7 | −5.1 | −6.0 |
| 156 | 1120 | 3680 | 1.0 | $6.7 \times 10^6$ | −8.1 | 1.7 | −4.2 | −4.3 |
| 157 | 1120 | 3590 | 1.0 | $4.8 \times 10^6$ | −9.2 | 3.9 | −5.0 | −6.7 |
| 158 | 1130 | 3770 | 1.1 | $5.1 \times 10^6$ | −8.5 | 4.1 | −4.2 | −6.7 |
| *159 | 1250 | | | A dense sintered material can not be obtained | | | | |
| 160 | 1170 | 4020 | 1.3 | $2.9 \times 10^6$ | −9.1 | 3.0 | −3.3 | −3.4 |
| 161 | 1140 | 4030 | 0.8 | $3.7 \times 10^6$ | −7.2 | 5.2 | −3.1 | −5.2 |
| 162 | 1120 | 3600 | 0.9 | $3.8 \times 10^6$ | −7.1 | 1.0 | −3.5 | −6.5 |
| 163 | 1070 | 3310 | 1.1 | $3.0 \times 10^6$ | −10.6 | −0.9 | −4.9 | −8.5 |
| *164 | 1050 | 2800 | 1.2 | $2.2 \times 10^6$ | −13.1 | −6.9 | −6.9 | −10.6 |

TABLE 3-continued

| Sample No. | Temperature of firing (°C.) | Electric Characteristics ||||||||
|---|---|---|---|---|---|---|---|---|
| | | $\epsilon s$ | tan δ (%) | Resistivity $\rho$ (MΩ·cm) | Change rates by temperature changes ΔC. (%) ||||
| | | | | | $\Delta C_{-55}$ | $\Delta C_{125}$ | $\Delta C_{-25}$ | $\Delta C_{85}$ |
| *165 | 1250 | A dense sintered material can not be obtained |||||||
| 166 | 1170 | 4110 | 1.1 | 5.6 × 10⁶ | 2.5 | 4.2 | −5.5 | −0.8 |
| 167 | 1140 | 3930 | 0.8 | 5.7 × 10⁶ | −9.9 | 7.4 | −6.0 | 0.8 |
| 168 | 1110 | 3640 | 0.8 | 6.3 × 10⁶ | −9.4 | 3.5 | −6.1 | −3.2 |
| 169 | 1070 | 3240 | 1.0 | 3.6 × 10⁶ | −10.9 | −0.1 | −7.2 | −5.3 |
| *170 | 1040 | 2850 | 1.3 | 3.3 × 10⁶ | −15.9 | −4.5 | −8.7 | −6.0 |

*marks show compared samples

It is clear by Tables 1 to 3 that, in the samples which is within the range of the component according to the invention, by firing the samples in a non-oxidation atmosphere at a temperature up to 1200° C., the ceramic capacitor having desired electric characteristics can be obtained, in which a dielectric constant at least 3000, a dielectric loss tan (δ) up to 2.5%, a resistivity $\rho$ at least $1 \times 10^6$ MΩ·cm, and capacitance change rates $\Delta C_{-55}$ and $\Delta C_{125}$ by temperature changes in the range of −15% to +15% and $\Delta C_{-25}$ and $\Delta C_{85}$ in the range of −10% to +10%.

On the other hand, the ceramic capacitor having desired electric characteristics can not be obtained by Samples No. 11 to 16, 42, 47, 48, 53, 59, 62, 65, 68, 71, 74, 77, 78, 82, 83, 87, 88, 98, 104 to 106, 112, 113, 117, 118, 122, 127, 139, 150 to 152, 159, 164, 165 and 170. Accordingly, the Samples mentioned above are out of the range of the invention.

The capacitance changes by temperature changes are shown only about $\Delta C_{-55}$, $\Delta C_{125}$, $\Delta C_{-25}$ and $\Delta C_{85}$ in Table 3, however, the capacitance change rates by temperature changes ΔC at a temperature in the whole range of −25° C. to +85° C. are within the range of −10% to +10%, and the capacitance change rates ΔC at a temperature in the whole range of −55° C. to +125° C. are within the range of −15% to +15%.

Next, the composition range of the basic component according to the invention will be described in conjunction with the composition range and the electric characteristics etc. of the Samples.

A dielectric ceramic composition having desired electric characteristics can be obtained if (x+z) is 0.01 as shown in Samples No. 89 to 92, however, $\Delta C_{-25}$ becomes out of the range of −10% to +10% and $\Delta C_{-55}$ becomes out of the range of −15% to +15% if (x+z) is 0 as shown in Sample No. 88. Therefore, the lower limit of (x+z) is 0.01.

A dielectric ceramic composition having desired electric characteristics can be obtained if (x+z) is 0.10 as shown in Samples No. 102, 107, 108 and 111, however, either of $\Delta C_{85}$, $\Delta C_{-25}$ and $\Delta C_{-55}$ becomes out of the ranges if (x+z) is 0.12 as shown in Samples No. 98, 104, 105 and 112.

However, a dielectric ceramic composition having desired electric characteristics can not be obtained if z is over 0.05 even if (x+z) is 0.06 as shown in Sample No. 106. Therefore, the upper limit of z is 0.05 and the upper limit of (x+z) is 0.10, simultaneously.

Mg and Zn of the M component and Ca and Sr of the L component work for almost the same function, so that either of Mg and Zn or both thereof can be used on the condition of 0<x<0.10, and either of Ca and Sr or both thereof can be used on the condition of 0<z≦0.05.

It is desirable that the value of x+z is in the range of 0.01 to 0.10 in any case of one or more than one of M components and L components.

A dielectric ceramic composition having desired electric characteristics can be obtained if y is 0.04 as shown in Samples No. 58, 61, 64, 67, 70, 73, 76 and 126, however, a dense sintered material can not be obtained if y is 0.06 as shown in Samples No. 59, 62, 65, 68, 71, 74, 77, 127 and 139. Therefore, the upper limit of y is 0.04.

Sc, Y, Dy, Ho, Er and Yb of the R component work for almost the same function, so that any one or more than one of them can be used. However, it is desirable that the value of y is up to 0.04 in any case. There is observed a significant effect even if y is a small value in the vicinity of 0 so long as y is up to 0.04.

The R component contributes to an improvement of the temperature characteristic of capacitance of a dielectric ceramic composition. By adding the R component into the dielectric ceramic composition, the capacitance change rates $\Delta C_{-55}$ to $\Delta C_{125}$ at a temperature in the range of −55° C. to 125° C. become within the range of −15% to +15%, the capacitance change rates $\Delta C_{-25}$ to $\Delta C_{85}$ at a temperature in the range of −25° C. to 85° C. become within a range from −10% to +10%, and each capacitance change rate at each temperature range becomes small. Additionally, the R component has a function of increasing the resistivity $\rho$ and improving the sintering characteristic of the dielectric ceramic composition.

A dielectric ceramic composition having desired electric characteristics can be obtained if α is 0.005 as shown in Samples No. 79 and 84, however, the capacitance change rate $\Delta C_{-25}$ by temperature changes becomes out of the range of −10% to +10%, and $\Delta C_{-55}$ becomes out of the range of −15% to +15%, if α is 0 as shown in Samples No. 78 and 83. Therefore, the lower limit of α is 0.005.

A dielectric ceramic composition having desired electric characteristics can be obtained if α is 0.04 as shown in Samples No. 81 and 86, however, the capacitance change rate $\Delta C_{85}$ by temperature changes becomes out of the range of −10% to +10%, if α is 0.05 as shown in Samples No. 82 and 87. Therefore, the lower limit of α is 0.04.

A dielectric ceramic composition having desired electric characteristics can be obtained if k is 1.00 as shown in Samples No. 114 and 119, however, the resistivity $\rho$ becomes considerably small as $1 \times 10^6$ MΩ·cm, if k is smaller than 1.0 as shown in Samples No. 113 and 118. Therefore, the lower limit of k is 1.00

A dielectric ceramic composition having desired electric characteristics can be obtained if k is 1.05 as shown in Samples No. 116 and 121, however, a dense sintered material can not be obtained if k is larger than 1.05 as shown in Samples No. 117 and 122. Therefore, the upper limit of k is 1.05.

Next, the amount and the composition range of the additional component including $Li_2O$—$SiO_2$—MO according to the first and the third inventions will be described in conjunction with the composition range and the electric characteristics etc. of the Samples.

A dielectric ceramic compositions having desired electric characteristics can be obtained if the amount of the additional component added is 0.2 weight portions in 100 weight portions of the basic component by firing at a temperature in the range of 1180° C. to 1190° C. as shown in Samples No. 43 and 49, however, a dense sintered material can not be obtained if the amount of the additional component is 0 even if the firing temperature is 1250° C. as shown in Samples No. 42 and 48. Therefore, the lower limit of the amount of the additional component is 0.2 weight portions.

A dielectric ceramic composition having desired electric characteristics can be obtained if the amount of the additional component added is 5.0 weight portions in 100 weight portions of the basic component as shown in Samples No. 46 and 52, however, the dielectric constant $\epsilon_s$ becomes smaller than 3000 and the capacitance change rate $\Delta C_{-55}$ by temperature changes becomes out of the range of $-15\%$ to $+15\%$, if the amount of the additional component is 7.0 as shown in Samples No. 47 and 53. Therefore, the upper limit of the amount of the additional component is 5.0 weight portions.

Figure 2:
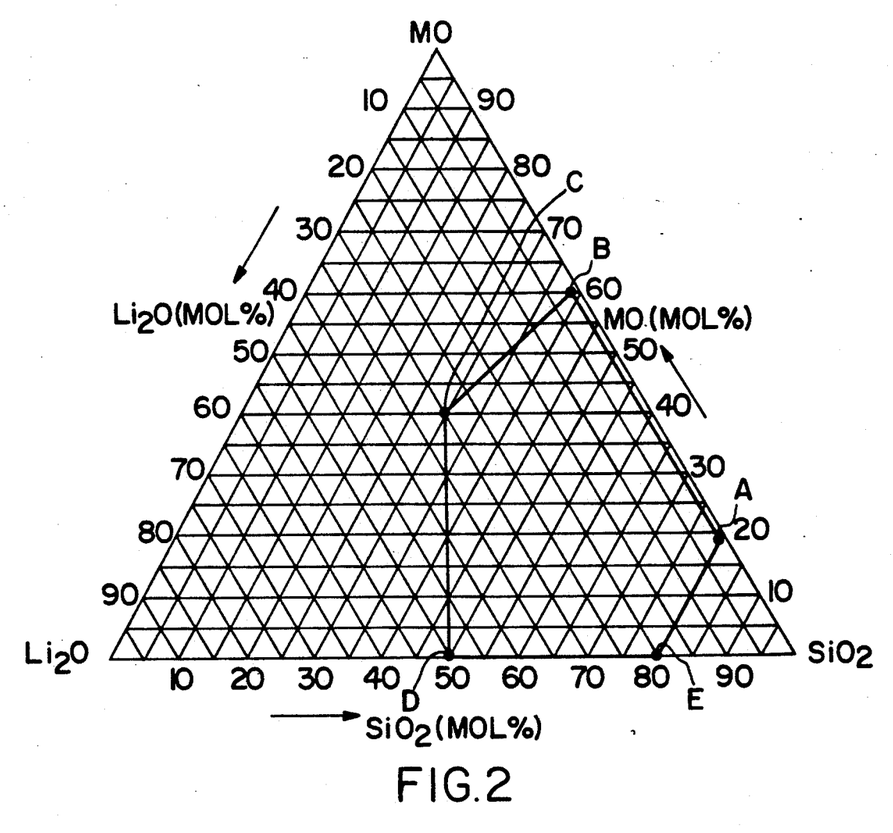
FIG. 2 is a ternary-system diagram showing the composition ratio in the additional component according to the first invention.

The composition ratio in the additional component is desired to be within the area profiled by a polygonal line connecting the first to fifth vertexes of A to E in turn in FIG. 2 showing the ratio of the components of $Li_2O$—$SiO_2$—MO.

In FIG. 2 of the ternary system diagram, the first vertex A represents the composition of Sample No. 1 in which $Li_2O$ is 1 mol %, $SiO_2$ is 80 mol % and MO is 19 mol %, the second vertex B represents the composition Sample No. 2 in which $Li_2O$ is 1 mol %, $SiO_2$ is 39 mol % and MO is 60 mol %, the third vertex C represents the composition of Sample No. 3 in which $Li_2O$ is 30 mol %, $SiO_2$ is 30 mol % and MO is 40 mol %, the fourth vertex D represents the composition of Sample No. 4 in which $Li_2O$ is 50 mol %, $SiO_2$ is 50 mol % and MO is 0 mol %, and the fifth vertex E represents the composition of Sample No. 5 in which $Li_2O$ is 20 mol %, $SiO_2$ is 80 mol % and MO is 0 mol %.

A dielectric ceramic composition having desired electric characteristics can be obtained if the composition ratio of the additional component is within the area described above, however, a dense sintered material can not be obtained if the composition ratio is out of the area as shown in Samples No. 11 to 16.

MO component may be one of metal oxides selected from a group consisting of BaO, MgO, ZnO, SrO and CaO as like in Samples No. 17 to 21, or more than one of them blended in adequate ratio as like in other samples.

Next, the amount and the composition range of the additional component including $B_2O_3$—$SiO_2$—MO according to the second or fourth invention will be described in conjunction with the composition range and the electric characteristics etc. of the Samples.

A dielectric ceramic composition having desired electric characteristics can be obtained if the amount of the additional component added is 0.2 weight portions in 100 weight portions of the basic component by firing at 1170° C. as shown in Samples 160 and 166, however, a dense sintered material can not be obtained if the additional component is 0 weight portions even if the temperature is at 1250° C. Therefore, the lower limit of the amount of the additional component is 0.2 weight portions.

A dielectric ceramic composition having desired electric characteristics can be obtained if the amount of the additional component added is 5.0 weight portions in 100 weight portions of the basic component as shown in Samples 163 and 168, however, the dielectric constant $\epsilon_s$ becomes below 3000 and the capacitance change rate $\Delta C_{-55}$ by temperature changes becomes out of the range of $-15\%$ to $+15\%$, if the additional component is 7.0 weight portions as shown in Samples No. 164 and 170.

Figure 3:
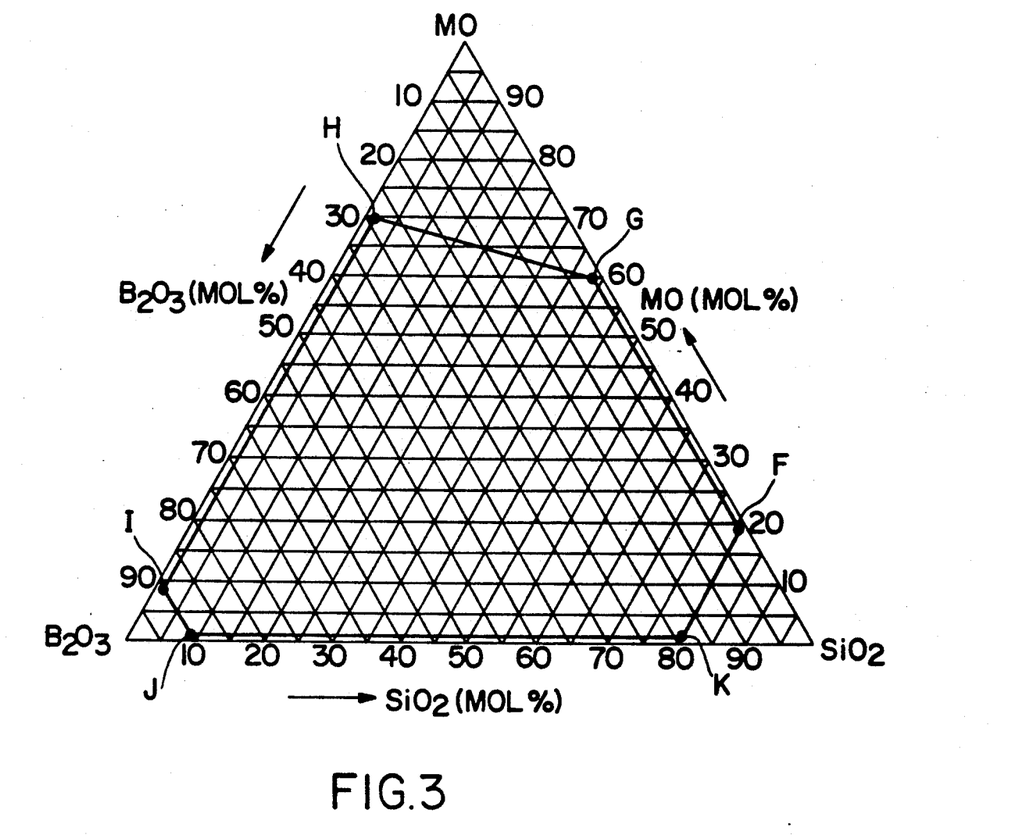
FIG. 3 is a ternary-system diagram showing the composition ratio in the additional component according to the second invention.

The composition ratio in the additional component is desired to be within the area profiled by a polygonal line connecting the first to sixth vertexes of F to K in turn in FIG. 3 showing the ratio of the components of $Ba_2O_3$—$SiO_2$—MO.

In FIG. 3 of the ternary system diagram, the first vertex F represents the composition of Sample No. 140 in which the amounts of $B_2O_3$ is 1 mol %, $SiO_2$ is 80 mol % and MO is 19 mol %, the second vertex G represents the composition of Sample No. 141 in which the amounts of $B_2O_3$ is 1 mol %, $SiO_2$ is 39 mol % and MO is 60 mol %, the third vertex H represents the composition of Sample No. 142 in which the amounts of $B_2O_3$ is 30 mol %, $SiO_2$ is 0 mol % and MO is 70 mol %, the fourth vertex I represents the composition of Sample No. 143 in which the amounts of $B_2O_3$ is 90 mol %, $SiO_2$ is 0 mol % and MO is 10 mol %, the fifth vertex J represents the composition of Sample No. 144 in which the amounts of $B_2O_3$ is 90 mol %, $SiO_2$ is 10 mol % and MO is 0 mol %, and the sixth vertex K represents the composition of Sample No. 145 in which the amounts of $B_2O_3$ is 20 mol %, $SiO_2$ is 80 mol % and MO is 0 mol %.

A dielectric ceramic composition having desired electric characteristics can be obtained if the composition of the additional component is within the area described above, however, a dense sintered material can not be obtained if the composition ratio is out of the area as shown in Samples No. 150 to 152.

MO component may be one of metal oxides selected from a group consisting of BaO, MgO, ZnO, SrO and CaO as like in Samples No. 153 to 157, or more than one of them blended in adequate ratio as like in other samples.

What is claimed is:

1. A ceramic capacitor, comprising:

at least one dielectric ceramic layer of a dielectric ceramic composition and at least two internal electrodes sandwiching said dielectric ceramic composition;

said dielectric ceramic composition comprising a fired mixture of a basic component of 100 weight portions and an additional compenent in the range of 0.2 to 5 weight portions;

said basic component comprising a material represent by the following formula:

$(1-\alpha)\{(Ba_{k-x-z}M_xL_z)O_k(Ti_{1-y}R_y)O_{2-y/2}\} + \alpha BaZrO_3$ where, M is Mg and/or Zn, L is Ca and/or Sr, R is one or more metal elements selected from the group consisting of Sc, Y, Gd, Dy, Ho, Er, Yb, Tb, Tm and Lu; and $\alpha$, k, x, z and y are numerals fulfilling the following conditions:

$0.005 \leq \alpha \leq 0.04$ $1.00 \leq k \leq 1.05$ $0 < x < 0.10$ $0 < z < 0.05$ $0.01 \leq x+z \leq 0.10$ $0 < y \leq 0.04$;

said additional component comprising $Li_2O$, $SiO_2$ and MO (wherein said MO is at least one metal oxide selected from the group consisting of BaO, SrO, CaO, MgO and ZnO); and at least one metal oxide selected from a group consisting of BaO, SrO, CaO, MgO and ZnO); and a ratio among amounts of $Li_2O$, $SiO_2$ and MO in said additional component is within an area in a ternary system diagram of mol % having five vertexes of first to fifth vertexes, wherein:

said first vertex A represents a condition in which amounts of $Li_2O$ is 1 mol %, $SiO_2$ is 80 mol % and MO is 19 mol %;

said second vertex B represents a condition in which amounts of $Li_2O$ is 1 mol %, $SiO_2$ is 39 mol % and MO is 60 mol %;

said third vertex C represents a condition in which amounts of $Li_2O$ is 30 mol %, $SiO_2$ is 30 mol % and MO is 40 mol %;

said fourth vertex D represents a condition in which amounts of $Li_2O$ is 50 mol %, $SiO_2$ is 50 mol % and MO is 0 mol %; and said fifth vertex E represents a condition in which amounts of $Li_2O$ is 20 mol %, $SiO_2$ is 80 mol % and MO is 0 mol %.

2. A ceramic capacitor, comprising:

at least one dielectric ceramic layer comprising a dielectric ceramic composition and at least two internal electrodes sandwiching said dielectric ceramic composition;

said dielectric ceramic composition comprising a fired mixture of a basic component of 100 weight portions and and additional component in the range of 0.2 to 5 weight portions:

said basic component comprising a material represented by the following formula:

$(1-\alpha)\{(Ba_{k-x-z}M_xL_z)O_k(Ti_{1-y}R_y)O_{2-y/2}\}+\alpha BaZrO_3$ where, M is Mg and/or Zn, L is Ca and/or Sr, R is one or more metal elements selected from the group consisting of Sc, Y, Gd, Dy, Ho, Er, Yb, Tb, Tm and Lu; and $\alpha$, k, x, z and y are numerals fulfilling the following conditions:

$0.005 \leq \alpha \leq 0.04$ $1.00 \leq k \leq 1.05$ $0 < x < 0.10$ $0 < z \leq 0.05$ $0.01 \leq x+z \leq 0.10$ $0 < y \leq 0.04$;

said additional component comprising $B_2O_3$, $SiO_2$ and MO (wherein said MO is at least one metal oxide selected from the group consisting of BaO, SrO, CaO, MgO and ZnO); and a ratio amoung amounts of $B_2O_3$, $SiO_2$ and MO in said additional component being within a area in a ternary system diagram of mol % having six vertexes of first to sixth vertexes, wherein:

said first vertex A represents a conditon in which amounts of $B_2O_3$ is 1 mol %, $SiO_2$ is 80 mol % and MO is 19 mol %;

said second vertex B represents a conditon in which amounts of $B_2O_3$ is 1 mol %, $SiO_2$ is 39 mol % and MO is 60 mol %;

said third vertex C represents a condition in which amounts of $B_2O_3$ is 30 mol %, $SiO_2$ is 0 mol % and MO is 70 mol %;

said fourth vertex D represents a condition in which amounts of $B_2O_3$ is 90 mol %, $SiO_2$ is 0 mol % and MO is 10 mol%;

said fifth vertex E represents a condition in which amounts of $B_2O_3$ is 90 mol %, $SiO_2$ is 10 mol % and MO is 0 mol %; and said sixth vertex F represents a condition in which amounts of $B_2O_3$ is 20 mol %, $SiO_2$ is 80 mol % and MO is 0 mol %.

3. A method for fabricating a ceramic capacitor, comprising the steps of:

providing a mixture of non-sintered ceramic powder;

forming a non-sintered ceramic sheet comprising said mixture;

fabricating a laminated structure in which said non-sintered ceramic sheet is sandwiched between at least two conductive paste layers;

firing said laminated structure under a non-oxidation atmosphere; and heating said fired laminated structure under an oxidation atmosphere;

said mixture of non-sintered ceramic powder comprising a basic component of 100 weight portions and an additional component in the range of 0.2 to 5 weight portions;

said basic component comprising a material represented by the following formula:

$(1-\alpha)\{(Ba_{k-x-z}M_xL_z)O_k(Ti_{1-y}R_y)O_{2-y/2}\}+\alpha BaZrO_3$ where, M is Mg and/or Zn, L is Ca and/or Sr, R is one or more metal elements selected from a group consisting of Sc, Y, Gd, Dy, Ho, Er, Yb, Tb, Tm and Lu; and $\alpha$, k, x, z and y are numerals fulfilling the following conditions:

$0.005 \leq \alpha \leq 0.04$ $1.00 \leq k \leq 1.05$ $0 < x < 0.10$ $0 < z \leq 0.05$ $0.01 \leq x+z \leq 0.10$ $0 < y \leq 0.04$;

said additional component comprising Li$_2$O, SiO$_2$, CaO and MO wherein said MO is at least one metal oxide selected from the group consisting of BaO, SrO, CaO, MgO and ZnO); and a ratio among amounts of Li$_2$O, SiO$_2$, CaO and MO in said additional component being within an area in a ternary system diagram of mol % having five vertexes of first to fifth vertexes, wherein:

said first vertex A represents a condition in which amounts of Li$_2$O is 1 mol %, SiO$_2$ is 80 mol % and MO is 19 mol %;

said second vertex B represents a condition in which amounts of Li$_2$O is 1 mol %, SiO$_2$ is 39 mol % and MO is 60 mol %;

said third vertex C represents a condition in which amounts of Li$_2$O is 30 mol %, SiO$_2$ is 30 mol % and MO is 40 mol %;

said fourth vertex D represents a condition in which amounts of Li$_2$O is 50 mol %, SiO$_2$ is 50 mol % and MO is 0 mol %; and said fifth vertex E represents a condition in which amounts of Li$_2$O is 20 mol %, SiO$_2$ is 80 mol % and MO is 0 mol %.

4. A method for fabricating a ceramic capacitor, comprising the steps of:

providing a mixture of non-sintered ceramic powder;

forming a non-sintered ceramic sheet comprising said mixture;

fabricating a laminated structure in which said non-sintered ceramic sheet is sandwiched between at least two conductive paste layers;

firing said laminated structure under a non-oxidation atmosphere; and heating said fired laminated structure under an oxidation atmosphere;

said mixture of non-sintered ceramic powder comprising a fired mixture of a basic component of 100 weight portions and an additional component in the range of 0.2 to 5 weight portions:

said basic component comprising a material represented by the following formula:

$(1-\alpha)\{(Ba_{k-x-z}M_xL_z)O_k(Ti_{1-y}R_y)O_{2-y/2}\} + \alpha BaZrO_3$ where, M is Mg and/or Zn, L is Ca and/or Sr, R is one or more metal elements selected from the group consisting of Sc, Y, Gd, Dy, Ho, Er, Yb, Tb, Tm and Lu; and $\alpha$, k, x, z and y are numerals fulfilling the following conditions:

$0.005 \leq \alpha \leq 0.04$ $1.00 \leq k \leq 1.05$ $0 < x < 0.10$ $0 < z \leq 0.05$ $0.01 \leq = x+z \leq 0.10$ $0 < y \leq 0.04;$ said additional component comprising B$_2$O$_3$, SiO$_2$ and MO (wherein said MO is at least one metal oxide selected from the group consisting of BaO, SrO, CaO, MgO and ZnO; and a ratio among amount of B$_2$O$_3$, SiO$_2$ and MO in said additional component being within an area in a ternary system diagram of mol % having six vertexes of first to sixth vertexes, wherein:

said first vertex A represents a condition in which amounts of B$_2$O$_3$ is 1 mol %, SiO$_2$ is 80 mol % and MO is 19 mol %;

said second vertex B represents a conditon in which amounts of B$_2$O$_3$ is 1 mol %, SiO$_2$ is 39 mol % and MO is 60 mol %;

said third vertex C represents a condition in which amounts of B$_2$O$_3$ is 30 mol %, SiO$_2$ is 0 mol % and MO is 70 mol %;

said fourth vertex D represents a condition in which amounts of B$_2$O$_3$ is 90 mol %, SiO$_2$ is 0 mol % and MO is 10 mol %;

said fifth vertex E represents a condition in which amounts of B$_2$O$_3$ is 90 mol %, SiO$_2$ is 10 mol % and MO is 0 mol %; and said sixth vertex F represents a condition in which amounts of B$_2$O$_3$ is 20 mol %, SiO$_2$ is 80 mol % and MO is 0 mol %.

* * * * *